United States Patent [19]

Strolle

[11] Patent Number: 4,656,467
[45] Date of Patent: Apr. 7, 1987

[54] TV GRAPHIC DISPLAYS WITHOUT QUANTIZING ERRORS FROM COMPACT IMAGE MEMORY

[75] Inventor: Christopher H. Strolle, Montgomery County, Pa.

[73] Assignee: RCA Corporation, Princeton, N.J.

[21] Appl. No.: 695,224

[22] Filed: Jan. 25, 1985

Related U.S. Application Data

[63] Continuation of Ser. No. 327,631, Dec. 4, 1981, abandoned.

[51] Int. Cl.[4] .............................................. G09G 1/00
[52] U.S. Cl. .................................... 340/727; 340/747; 342/185
[58] Field of Search ............... 340/723, 724, 727, 747; 358/140; 343/5 SC

[56] References Cited

U.S. PATENT DOCUMENTS

| | | | |
|---|---|---|---|
| 4,002,827 | 1/1977 | Nevin et al. | 358/140 |
| 4,127,850 | 11/1978 | Vallins | 340/727 |
| 4,360,831 | 11/1982 | Kellar | 340/747 |

Primary Examiner—Marshall M. Curtis
Attorney, Agent, or Firm—Joseph S. Tripoli; Allen LeRoy Limberg

[57] ABSTRACT

High-amplitude-resolution graphics for raster-scanned television systems are generated beginning with relatively low-amplitude-resolution sampled data from image memory affording spatial resolution approximately the same as that of the television signal, generally at least as large as that afforded by the number of lines per field and by the video bandwidth used in the television system. The sample-data raster scan used in the television system is converted to the coordinate system used for memory addressing. The whole-number portions of the memory address are used to access addressable sample data at points surrounding the point specified by the complete address including whole-number and fractional portions; and the fractional portions of the address are used to perform an interpolation between or among the accessed sample data. The interpolation result has high amplitude resolution despite the low amplitude resolution of sample data stored in memory, which high amplitude resolution arises from conversion of the spatial resolution in excess of that afforded by addressable locations in memory. Image memory can take the form of read-only memory mapping points in an area or in a line with its whole-number addressing, or may simply comprise one or more comparators, for example. The generation of complex, high-resolution displays can thus be supported by a small amount of digital memory.

50 Claims, 20 Drawing Figures

TV GRAPHIC DISPLAYS WITHOUT QUANTIZING ERRORS FROM COMPACT IMAGE MEMORY

This in a continuation of application Ser. No. 327,631, filed Dec. 4, 1981, now abandoned.

The invention relates to the digital raster scanning of television system display memory storing low-amplitude-resolution data in its storage locations, which conformally map a graphic image in a coordinate system other than that in which the display screen is raster scanned, and, more particularly, to the conversion of the spatial resolution of the stored graphic image in excess of the sampling rate of digital phantom raster scan to increased amplitude resolution in order to avoid the appearance of spatial quantizing errors (commonly termed "staircasing" or "rastering") in the displayed graphic image.

The term "phantom raster" refers to a raster which does not correspond to that actually scanned on the display screen, being different in terms of rotation or scale, or being described in a coordinate system other than an x, y Cartesian coordinate system in which x is the direction of pixel by pixel scan along a scan line and y is the direction of scanning line advance.

Television display systems which generate raster-scanned display from digital video information can be categorized according to whether they are designed to display real images originally obtained by camera response to actual objects or to display synthetic, or graphic, images generated by computation or from read-only memory (ROM). The digitized video in the former category of TV display systems is generally characterized by relatively high amplitude resolution ($\geq 2^7$ bits), while the digital video in the latter category is generally characterized by relatively low amplitude resolution ($\geq 2^6$ bits). Indeed, often only one bit of resolution is afforded each video signal sample in many TV graphic display systems, which bit indicates whether or not there is to be energization of the picture element ("pixel" for short) on the display screen which pixel is associated with that video signal sample.

TV graphic display systems normally include an image memory from which stored video signal samples are serially retrieved to generate the video signal used to refresh the display. The image memory may be a read-only memory (ROM), usually a programmable one, storing a graphic of predetermined nature, or the image memory may be a random-access memory (RAM) which is updated at times other than those times when it is being read to supply video signal samples from which the display may be refreshed. In either case, the memory is almost invariably one the storage locations of which are addressed by column and row. The column and row addresses of the storage locations in the image memory can be viewed as orthogonal coordinates specifying a point in an image space. This image space by translation, rotation, and selective compression and expansion over its expanse can be conformed to the space on the display screen.

The invention involves the use of at least one image memory wherein the column and row addresses of the display memory are expressed in coordinates other than the x, y Cartesian coordinates respectively perpendicular to and parallel to the direction of line scan in the raster-scanning of the display screen, and wherein the display screen raster scan or a portion if it is scan-converted to a phantom raster scan. These coordinates may be Cartesian in form, but rotated from x, y Cartesian coordinates, or polar in form, or may take one of the more infrequently encountered forms—e.g. parabolic, elliptic, or hyperbolic. For compactness each image memory stores but once each of the low-amplitude-resolution samples at points in image space specified by integral address coordinates, although samples concerning a single point in image space may be stored in each of a plurality of different image memories respectively addressed during their reading in different coordinate systems. Each image memory is arranged for multiple-addressing so that four data descriptive of spatially adjacent points in image space are accessed in each read cycle; this is done to facilitate the weighted summation of data stored in image memory to generate samples of the image for points in image space not actually addressable in image memory. Serially addressing each of four points in memory during successive portions of a complete read cycle and differentially combining the readouts from those points can be used to simulate parallel access to the four points, but involves operation of the display memory at four times video signal sampling rate—i.e. four times the pixel by pixel sampling rate along a scan line of raster scanned display. Preferably the four points in memory are accessed in parallel using spatial-positioning multiplexors as described in detail by L. A. Christopher, G. A. Reitmeier, T. R. Smith, and C. H. Strolle, the present inventor in their U.S. patent application Ser. No. 298,268 filed Aug. 31, 1981, entitled "WINDOW SCANNED MEMORY", and assigned to RCA Corporation, which application is incorporated herein by reference and issued July 17, 1984 as U.S. Pat. No. 4,460,958.

The graphic image stored in such image memory is retrieved by generating digital phantom raster scan on a sampled data basis in the coordinate system in which the graphic image is stored in memory and using the integral portions of each pair of coordinates in the generated stream of coordinates as the bases for calculating the addresses of the spatially adjacent storage locations in the display memory which are accessed during each of its read cycles. The fractional portions of each pair of coordinates are used to interpolate among digital video signal samples read from the image memory. The results of this two-dimensional interpolation are subject to a digital-to-analog conversion to form the video signal controlling the energization of pixels on the display screen.

Spatial quantization errors tend to appear in the displayed image generated by the foregoing process when the number of bits in the digital video signal samples is small, particularly when the samples are single-bit in nature, unless certain constraints are observed. These constraints involve conformation of the digital raster scan to the addressable locations in image memory, and the conformation of the boundaries of the stored graphic image to the addressable locations in the image memory. Operation within these constraints accommodates the undersampling of the graphic image caused by the image memory addressing being overly coarse in spatial resolution and so providing sampling at a spatial frequency below Nyquist rate, the accomodation coming about because the ommission of samples does not affect the phasing of the lower spatial frequency components in the video recovered from the image memory. Spatial frequency is the rate at which the graphic image changes amplitude per unit displacement in image space, analogous to temporal frequency (normally referred to simply as "frequency") being the rate at which the amplitude of a function of time changes per unit time.

Consider first the constraint that the digital raster scan conform to the addressable locations in the memory. If the raster scan coordinates do not correspond exactly to the memory address coordinates, and if the video signal sample at the storage location with address closest to the specified raster scan coordinates is retrieved from memory, this introduces a quantization error in the spatial position of this sample in the display image as compared to the graphic image stored in memory. Since this spatial quantization error varies from scan line to scan line and from pixel to pixel, it tends to be very noticeable to the viewer of the display. This quantization error can be attributed to scanning the graphic image in memory with a spatial bandwidth that is narrower than the spectrum of spatial frequencies in the graphic image. If the spectrum of spatial frequencies one seeks to use in describing the graphic image is properly circumscribed, this spatial quantization error can be eliminated by using two-dimensional interpolation between addressable locations in image memory to increase the spatial bandwidth of memory scanning and thus in effect introduce increased spatial resolution into memory scanning.

Accordingly, the analog model of the graphic image edge prior to digitization, which is used as a basis for determining the weighting functions involved in the interpolation process between spatially adjacent data available in parallel from image memory, is changed in the present invention from that of an amplitude step in the two-dimensional image space to that of a ramp from one amplitude to another. Such change reduces the high spatial-frequency content of the graphic image, so increased spatial resolution in the memory scanning will not generate alias frequencies to be confused with the spatial frequencies descriptive of the graphic image. That is, in the digital-sample representation of the image as an array of rectangular parallelepipeds centered in positions on crosspoints of a regular rectangular grid, some of which parallelepipeds are missing, each of the rectangular parallelepipeds is replaced with a respective right square pyramid with vertex at the original sample point coordinates, in superposed respective replicas of the original image space, in preparation for rescanning of the image by the sampling raster. So, as the coordinates of raster scan are closer or further distances from certain original sample points, the amplitude of the resampled graphic image is to be increasingly more or less influenced by the amplitude of those certain original sample points as continuous, rather than discontinuous, functions of those distances. The high spatial resolution of the sampling raster will control sampling along the slopes of the superposed pyramids to convert that high-spatial resolution to increased amplitude resolution of the video signal sample formed by the sum of the samples from the sampled pyramids. Because of integration effects of the phosphors in the cathode ray tube display device and because of human visual response characteristics, pixel response on the display screen to this increased-amplitude-resolution video will appear to a viewer to be substantially the same as that obtained were increased spatial resolution afforded by video sampling performed at higher rate with an increased number of scan lines.

Consider now the constraint that the stored graphic image conform to the image memory. The storage locations in the image memory exactly map only selected points in the image space with a resolution that depends on the number of column and row addresses for given area in the image space. The spacings of the column and row addresses in image space define an upper limit in each spatial direction on the spatial frequency of a graphic image which can be resolved by those address spacings. This limitation will control how fine a line or how small an incremental variation in edge dimension of a solid object can be resolved by an image memory with only one bit of image amplitude resolution, if the line or edge is disposed parallel to the direction of one of the address coordinates of the image memory. If the beginning or start of an edge transition of the graphic image is considered to be randomly translated respective to integral values of image memory address—i.e. at coordinates at least one of which is intermediate to the image memory addresses—the edge transitions must be resolved to closest integral image memory address, introducing an error into the stored graphic image information which is of a higher spatial frequency than the spatial bandwidth of the image memory. When the image memory is raster-scanned to retrieve the graphic image, this high-spatial-frequency error may or may not be very noticeable in the displayed image. It will not be very noticeable if the rapid scan direction of the display raster scan is parallel or perpendicular to the direction of the scan error, since the spatial quantizing error appears as merely a shortening or lengthening of the edge in error; at skew angles, though, the error introduces staircase discontinuities or "glitches" in the edge which are obvious to a viewer of the display. If the graphic image can be stored in the image memory without spatial quantizing error, insofar as edge resolution is concerned, this avoids a loss of information that is a source of edge distortions in the displayed image.

A better feeling why this is so can be obtained by assuming that the display system and the image memory afford such high resolution that spatial quantizing errors cannot be ascertained by a person viewing the display. If the locus of points in image space defined by two of the column (or row) addresses of this very high resolution memory coincide with the beginning and finishing of an edge transition in a graphic image, the description of that edge can be stored, dispensing with storage locations bearing intermediate column (or row) addresses, since the edge could be re-created without error using interpolation of the sort described earlier in this specification. Considering the remaining columns (or rows) of storage locations to conform to the beginning and finishing edge transition in the graphic image, if the beginning and finishing of the edge transition follows the loci in image space defined by those locations and has low spatial frequency content because one will allow some lack of definition as to the end point locations of those loci, the sampling rate along those loci can be lowered to sample only every $n^{th}$ location in each of them, n being an integer chosen to reduce the length of the display memory column (or row) to a practical number of storage locations. So, then, it is possible to store edge information with very high spatial resolution in an image memory with rather coarse addressing in spatial resolution terms, providing that the edge transitions of the graphic image are bounded by the loci defined by adjacent columns (or rows) of storage locations in the image memory. This condition is referred to herein as "conformance" of graphic image and image memory. (One can intuitively sense that it is unnecessary to make the spatial resolution of addressing of image memory substantially greater than the spatial resolution of pixel locations defined on the display screen by scan lines of successive video signal samples.)

To conform graphic image and image memory, the nature of the graphic image must be known or determined and the type of image memory selected accordingly. Horizontal and vertical straight lines on the display screen are best stored in image memories addressed by column and by row in x and y Cartesian coordinates, x and y being in directions in image space corresponding to directions parallel to and perpendicular to horizontal trace on the display screen. Parallel skew lines on the display screen are best stored in image memories addressed by column and by row in u and v Cartesian coordinates rotated respective to x and y Cartesian coordinates by the angle of skew. Random skew lines, circles, and circular arcs are best stored in image memories addressed by row and by column in radial and angular polar coordinates r and $\theta$, or in some function of r and in $\theta$.

An aspect of the invention is the use of separate image memories addressed in their own coordinate systems to store the different portions of a complete graphic image to which they conform, rather than attempting to store non-conforming portions of a graphic image, together with its conforming portions, in a single higher-amplitude-resolution image memory.

Certain types of "substantial conformance" of memory and graphic image permit acceptable presentations of the graphic image in the display screen. Skew lines of line graphics or boundaries of shaded images at ±45° angle with horizontal and vertical display axes and passing through pixel centers are examples of graphic image edges which substantially conform to a bit-map image memory addressed in x and y Cartesian coordinates. If the image memory addressed in x and y Cartesian coordinate stores video samples of a few bits, too few bits to resolve all graphic images satisfactorily, certain other skew lines or boundaries exhibit substantial conformance to this type of memory. Substantially conforming image edges exist for image memories addressed in other coordinate systems.

An aspect of the invention is choice of image memory coordinates for portions of the display so image edges either conform or substantially conform to the memory. Where substantially conforming images are to be programmably rotated or translated, the spatial resolution afforded by the image memory should, contrary to prior art practice, be sufficiently coarse that the image memory contents are not under-sampled during addressing of the memory during read out using phantom raster scan. Otherwise a phenomenon called "aliasing" will occur where high-spatial-frequency contents of the image, those above the sampling rate of phantom raster scan, will be heterodyned to below that rate.

FIGS. 6, 7, 8, and 9 are block diagrams of circuitry for calculating the weighted summation in ways that reduce the amount of digital multiplication used in such calculating.

Figure 1:
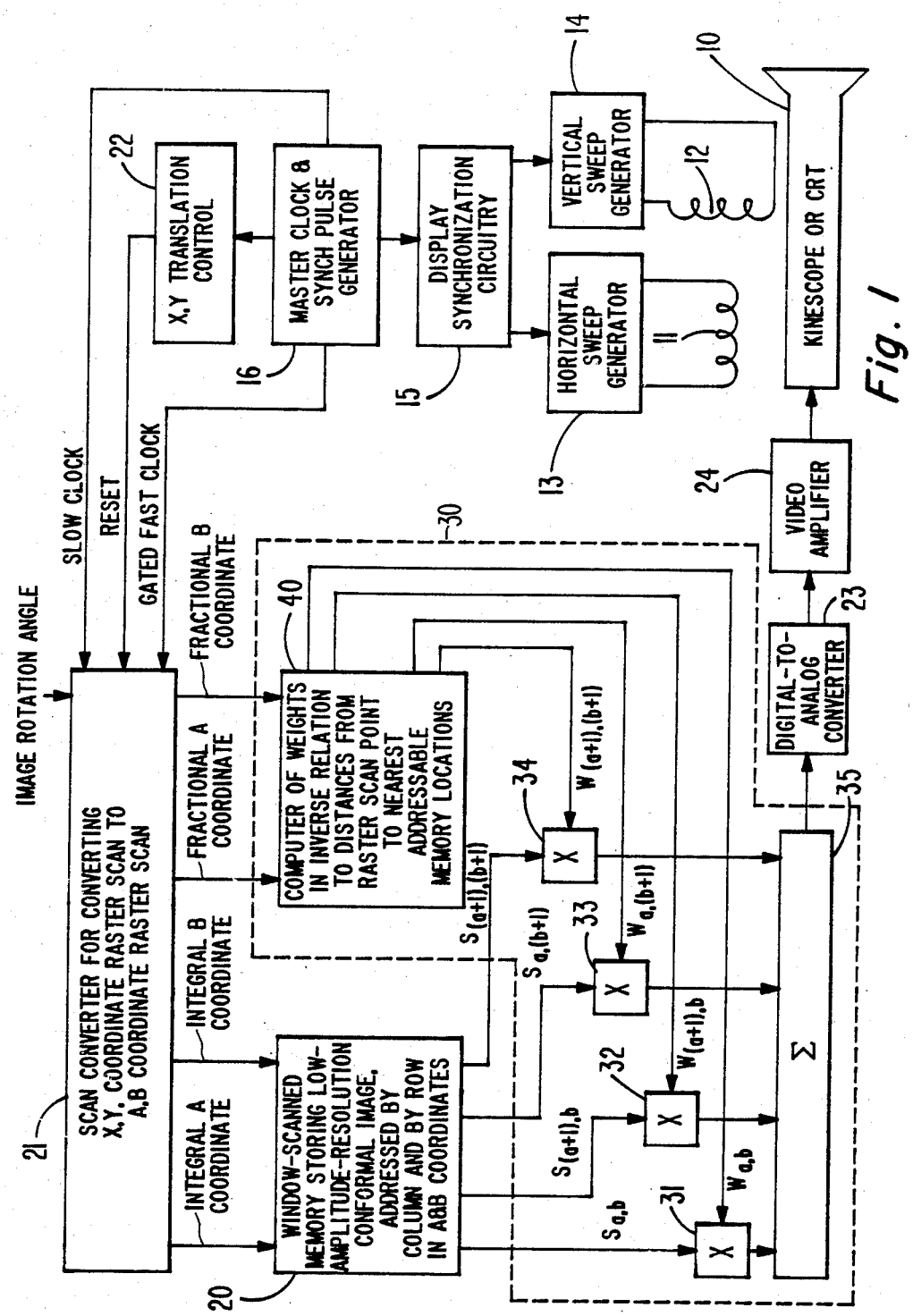
FIG. 1 is a block diagram of a raster-scanned television display system for a graphic image, which system embodies the invention and includes a weighted summation network.
Figure 10:
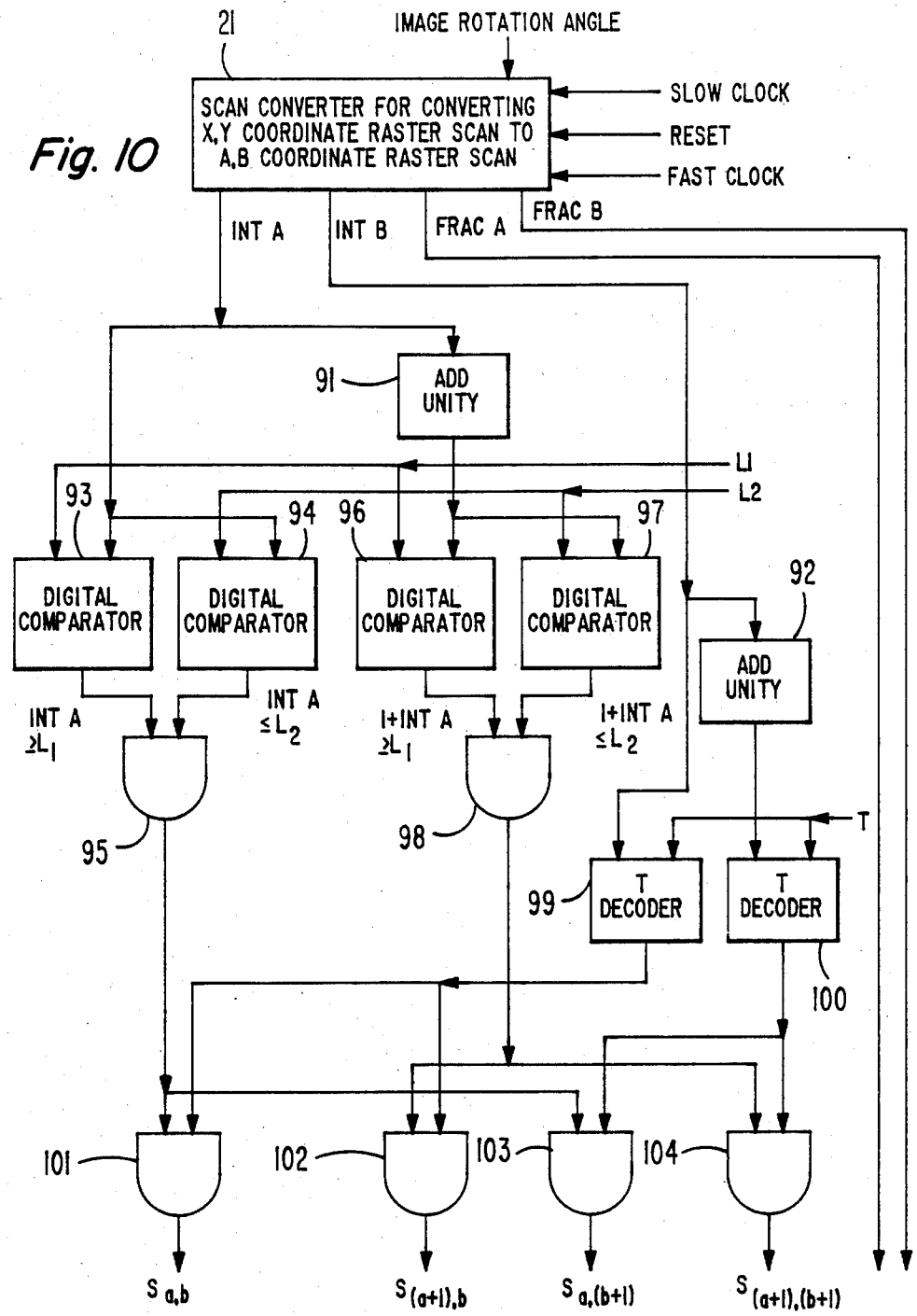
Figure 11:
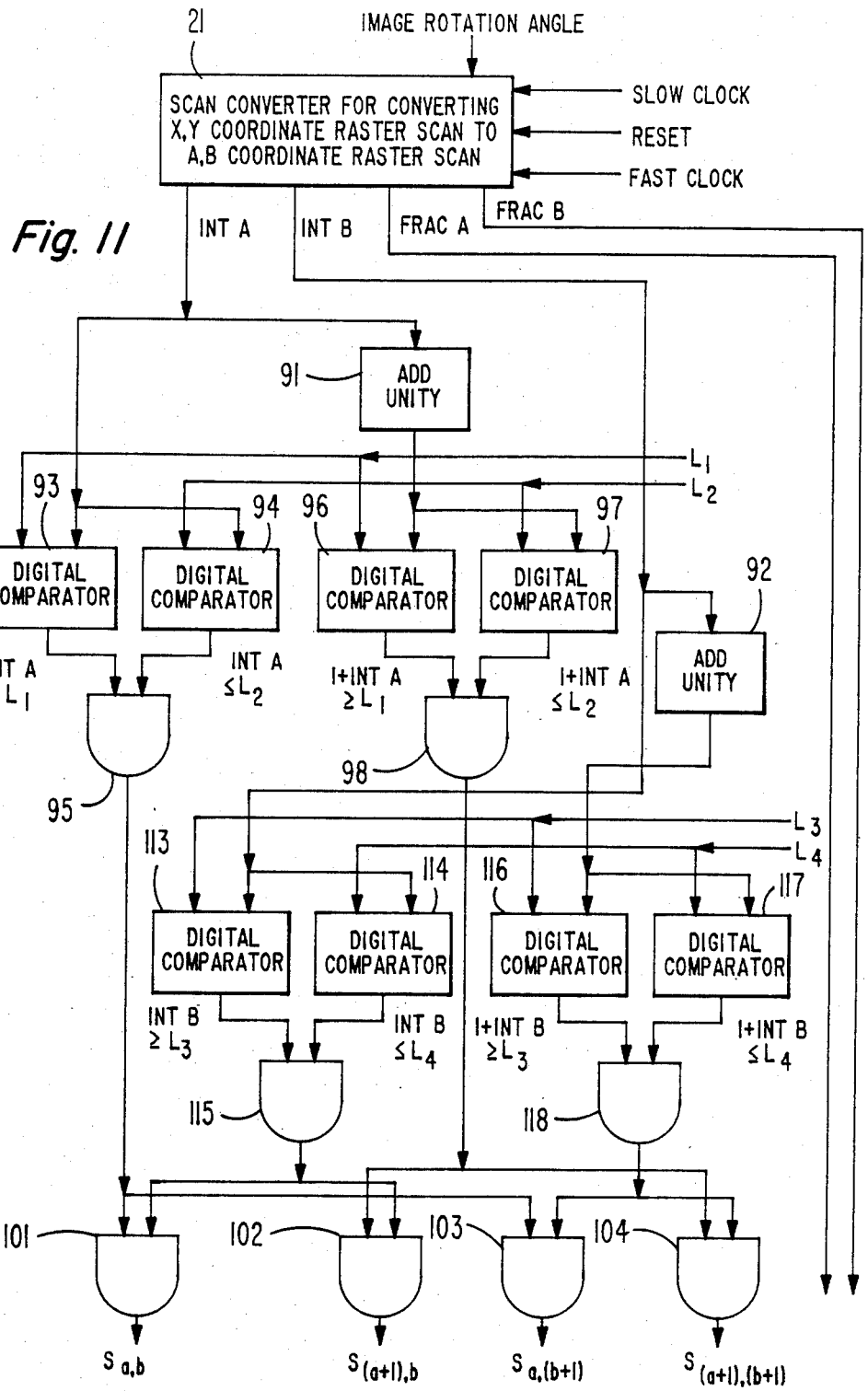

FIGS. 10 and 11 are block diagrams showing forms display memory used in connection with the invention may take alternative to the window-scanned memory addressed by column and by row shown in FIG. 1.

Figure 12:
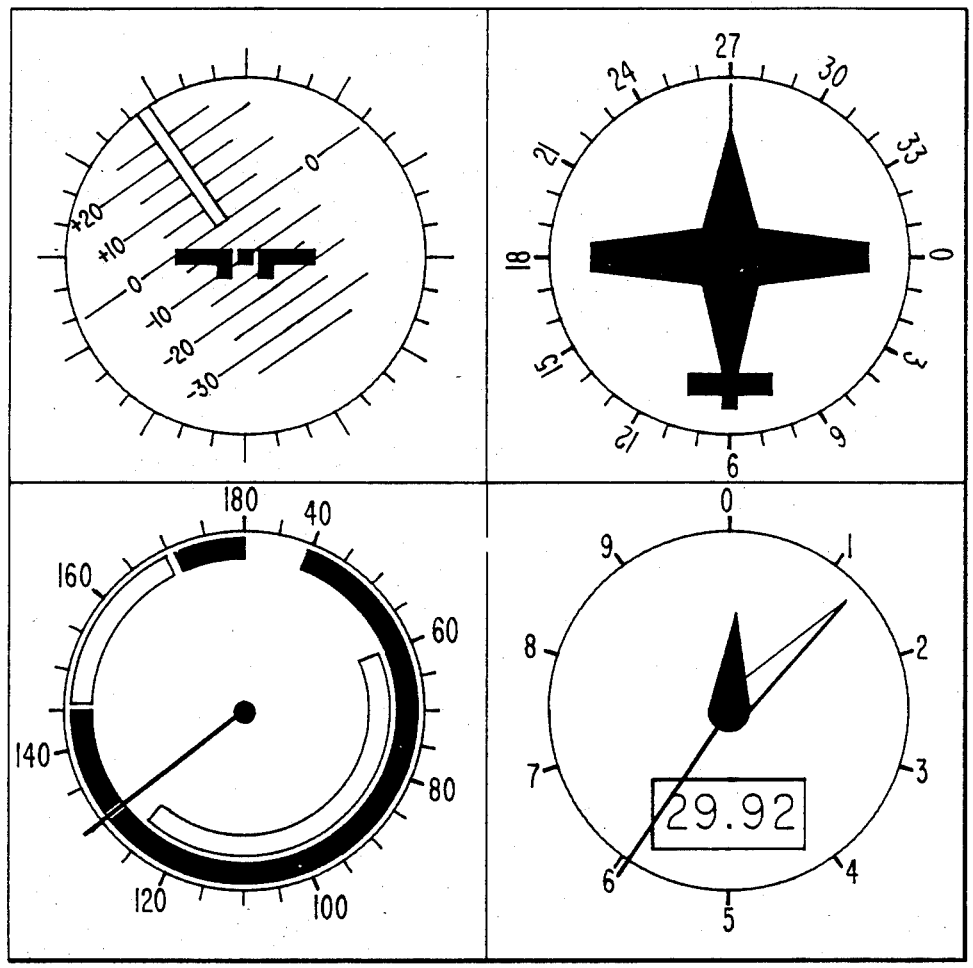

FIG. 12 depicts a display of attitude director indicator, horizontal situation indicator, airspeed indicator and altimeter for the cockpit of a small aircraft; and FIGS. 13–20 are block diagrams of apparatus for creating the FIG. 12 display from low-amplitude-resolution memory in accordance with the invention.

The FIG. 1 television system uses a kinescope, a projection tube, or other cathde ray tube (CRT) 10. The display screen of CRT 10 is raster-scanned responsive to the electromagnetic fields from a horizontal sweep coil 11 and a vertical sweep coil 12, supplied drive currents from a horizontal sweep generator 13 and a vertical sweep generator 14, respectively. The timing of the horizontal and vertical sweeps generated by sweep generators 13 and 14, in order to form raster scan in horizontal x and vertical y directions on CRT 10 display screen, is provided by conventional display synchronizing circuitry 15 responsive to horizontal and vertical synchronizing pulses from master clock and synchronizing pulse generator circuitry 16. It is preferable to use electromagnetic deflection with sweep circuitry like that used with broadcast television kinescopes for raster-scanning CRT 10, rather than electrostatic deflection, because by resonating the one of the sweep coils causing fast trace across the display screen, an appreciable amount of the energy expended for fast trace can be recovered during retrace.

The graphic image to be displayed on the CRT 10 display screen is stored in low-amplitude-resolution form in a memory 20, the storage locations of which are addressable by column and by row during each memory read cycle. However, not just one storage location is accessed during each memory read cycle. Rather an array of them is made available each memory read cycle through a scanning window, which window can access four storage locations in memory 20 responsive to the address of one of those storage locations. The scanning window can be provided by serially reading from the four storage locations by suitably incrementing the column and row partial addresses of the location with lowest column and row partial addresses by one in each direction and in both directions. Or the scanning window can be provided by dividing memory 20 into four submemories accessed through multiplexor means, so that the four storage locations can be accessed in parallel.

The nature of the orthogonal coordinates a, b used for addressing memory 20 by column and by row is chosen to suit the graphic image to be stored, so that the memory and the graphic image conform. That is, a line in the graphic image will be described by a succession of storage locations sharing the same column or row address. Straight lines in the graphic image will be stored in a memory 20 addressed in Cartesian coordinates; circles or arcs of circles will be stored in a memory 20 addressed in polar coordinates; etc. A scan converter 21 converts a raster scan in x, y coordinates to a raster scan in a, b coordinates for generating the read address coordinates for memory 20.

Scan converter 21 is shown as being of type receiving a SLOW CLOCK pulse from master clock and synchronizing pulse generator circuitry 16 every scan line. It also is of a type receiving GATED FAST CLOCK pulse train from circuitry 16 during each scan line, the pulses in this train being supplied at the video rate pixels are scanned in each scan line of the display. The scan converter 21 includes counters to keep track of x and y scan coordinates, the x counter counting GATED FAST CLOCK PULSES and the y counter counting SLOW CLOCK PULSES. These counters are initialized by a RESET pulse furnished by x, y translation control circuitry 22 at the time the master clock and sync pulse circuitry 16 indicates the sweep generators 13 and 14 have positioned the trace on CRT 10 screen where the corner of the raster scan earliest in time is to appear. The stream of x, y coordinates from the x and y counters which describe sample points in the x, y display raster are then converted to sample points in a, b coordinates which not only have respective integral portions int a and int b, but also have respective fractional portions frac a and frac b that afford a substantial degree (n bits) of additional two-dimensional spatial resolution. To get this requisite degree of additional spatial resolution while performing the scan conversion at video rates, accumulation processes, or table look-up from ROM techniques or combinations of the two can be used to generate the converted coordinates. Typically, the frac a and frac b terms should offer at least another four bits of spatial resolution in addition to that provided by the int a and int b terms.

Suppose scan converter 21 converts display raster scan sample points in x, y Cartesian coordinates to phantom raster scan sample points (hereafter referred to as "PRS sample points") in a, b coordinates that are another set u, v of Cartesian coordinates. Then frac a and frac b terms will be generated if the x, y and u, v coordinate system have an image rotation angle between them; and in some systems it will be desirable to be able to program the image rotation angle responsive to an IMAGE ROTATION ANGLE command input, as shown in FIG. 1. Suppose on the other hand scan converter 21 converts PRS sample points in x, y Cartesian coordinates to PRS sample points in polar, elliptic, or hyberbolic coordinates. Then frac a and frac b terms will be generated whether or not the image be rotated. Again, programmability of graphic image rotation may be provided for.

In any case, when one or both of the PRS sample point coordinates are non-integral, such that at least one of the frac a and frac b terms is non-zero in value, the problem arises of how to read memory 20 with enough spatial bandwidth to avoid the generation of spatial quantizing errors in the phantom raster scanning of that memory. The invention solves this problem by converting spatial residues to increased amplitude resolution. The increased amplitude resolution is obtained by means 30 for making a weighted summation of the four data samples $S_{a,b}$, $S_{(a+1),b}$, $S_{a,(b+1)}$ and $S_{(a+1),(b+1)}$ taken from storage locations with the respective addresses a,b; (a+1),b; a,(b+1) and (a+1),(b+1) in the window-scanned memory 20. Means 30 includes circuitry 40 for computing the weights $W_{a,b}$, $W_{(a+1),b}$, $W_{a,(b+1)}$ and $W_{(a+1),(b+1)}$ with which data samples $S_{a,b}$, $S_{(a+1),b}$, $S_{a,(b+1)}$ and $S_{(a+1),(b+1)}$ are to be respectively multiplied in multipliers 31, 32, 33, and 34 respectively prior to their summation in a summation network 35. The weighted summation from network 35 is the output of means 30, applied as digital input to a digital-to-analog converter 23, which responds with analog video amplified by video amplifier 24 to drive CRT 10.

Circuitry 40 responds to frac a or its complement, $\overline{\text{frac a}}$, and frac b or its complement, $\overline{\text{frac b}}$—which indicate the distances in image space of the PRS sample point $S_{PRS}$ from the image sample points $S_{a,b}$, $S_{(a+1),b}$, $S_{a,(b+1)}$ and $S_{(a+1),(b+1)}$ stored in memory 20—to compute a weight for each of the stored sample points dependent upon its distance from the phantom raster scan sample point. That is, the data samples $S_{a,b}$, $S_{(a+1),b}$, $S_{a,(b+1)}$, and $S_{(a+1),(b+1)}$ are treated as descriptive of square pyramids in image space rather than rectangular parallelepipeds.

Figure 2:
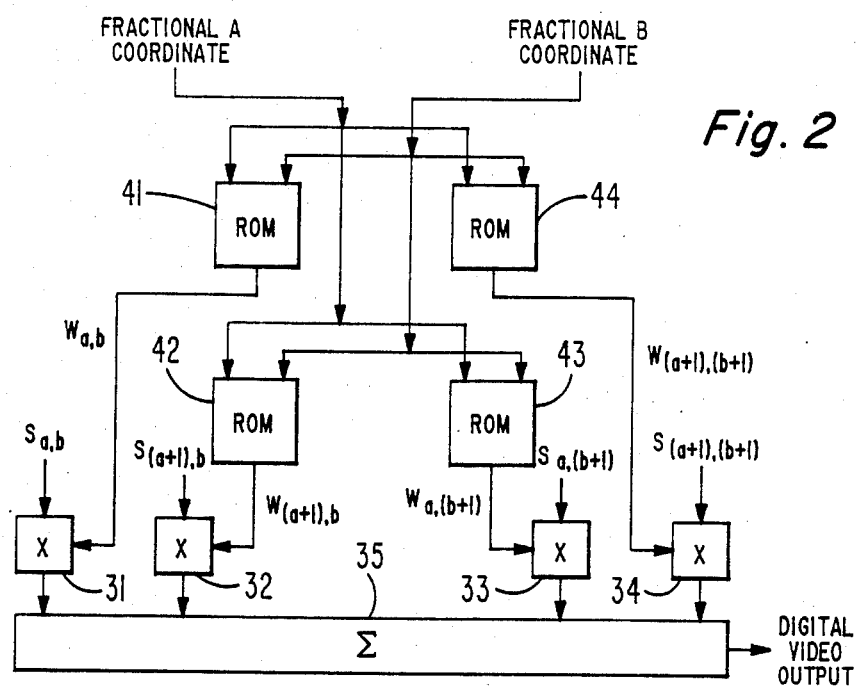
FIG. 2 is a block diagram specifying one form a computer of weights in the weighted summation network can take, which includes read only memory (ROM) table look-up.

This computation can be made using table look-up from each-only memory. FIG. 2 shows apparatus for doing this straightforwardly, built around four ROM's 41, 42, 43, 44 with the input of each addressed using frac a and frac b. Weights descriptive of a quadrant of square pyramid sampled at increments of frac a in the a direction and at increments of frac b in the b direction are stored at corresponding address locations in each of these ROM's. ROM 41 stores the weighting coefficient $W_{a,b}$ for each value of frac a and frac b coordinates, the value of $W_{a,b}$ selected as output responsive to frac a and frac b input being used to multiply $S_{a,b}$ in digital multiplier 31 $W_{(a+1),b}$, $W_{a,(b+1)}$ and $W_{(a+1),(b+1)}$ from ROM's 42, 43 and 44 respectively multiply $S_{(a+1),b}$, $S_{a,(b+1)}$ and $S_{(a+1),(b+1)}$ in digital multipliers 32, 33 and 34 respectively.

Where the samples $S_{a,b}$, $S_{(a+1),b}$, $S_{a,(b+1)}$ and $S_{(a+1),(b+1)}$ are single-bit samples, they may be applied as read-enable signals to ROM's 41, 42, 43 and 44 to effect the multiplications, the ROM's being arranged to otherwise put out zero-value. This saves the need for digital multipliers 31, 32, 33 and 34; and the outputs of ROM's 41, 42 43 and 44 in such case are applied directly to adder network 35.

Figure 3:
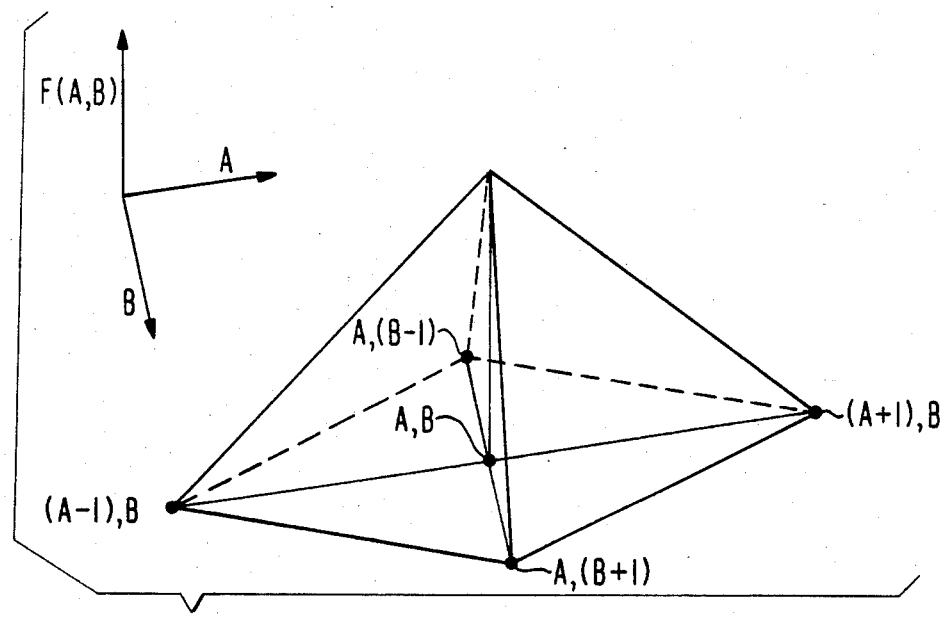
FIG. 3 is a figure in image space depicting a weighting function.
Figure 4:
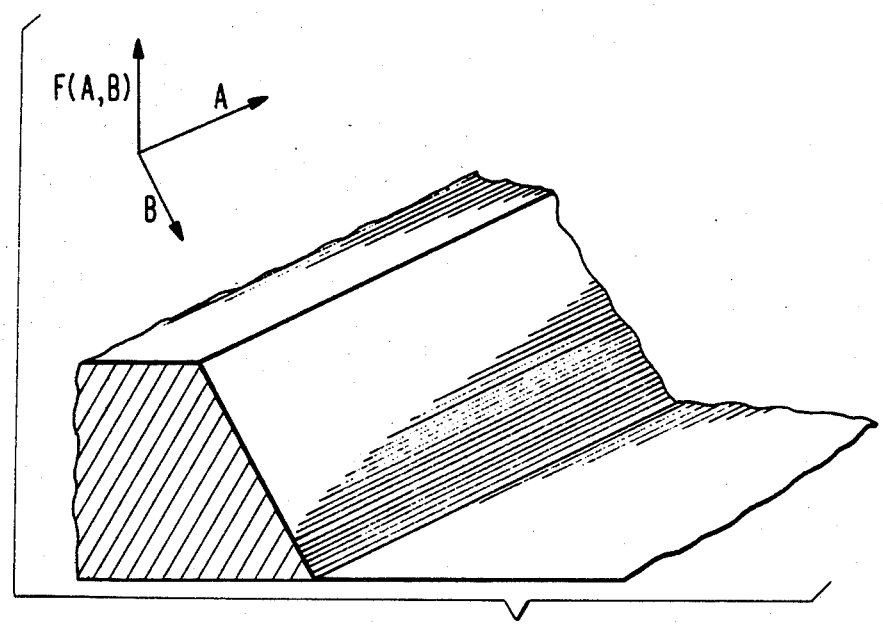
FIG. 4 is a figure depicting the edge of a graphic image in image space as constructed by superposition of such weighting functions.

FIG. 3 shows the pyramidal weighting function, a quadrantal section of which is stored in the FIG. 2 memory for computing weighting coefficients. The superposition of square-pyramid weighting functions like that of FIG. 3 at every point in an image space provides a surface of uniform height, unity, in image space; this means there is uniform density of sampling of an image space without need for sampling functions that are far-reaching into space—i.e., sampling functions that have bases extending beyond the image sample points closest to the image sample point underlying the apex of the sampling function. The square pyramid weighting function will cause the modelling of a discontinuity in the image—i.e., an edge conforming to the display memory storing the image—as shown in FIG. 4. The discontinuity is not a step function in a,b-coordinate image space, but rather is a ramp from one image height to another with a slope of unity on unit-spatial-resolution.

(In considering FIGS. 3 and 4, one must remember that the weighting function and the edge defined by superposed weighting functions, formed by convolution of the image from display memory with the weighting function are defined in a, b coordinate space which conformally maps display image space. That is, the shapes defined by the a, b coordinates are distorted from the shapes they cause on the display screen. The straight-line edge in a, b coordinates may well map into a curved line in the display image. Consider for example, the "straight line" defined by constant radial coordinate in polar coordinates which appears as a circle on the display screen.

Figure 5:
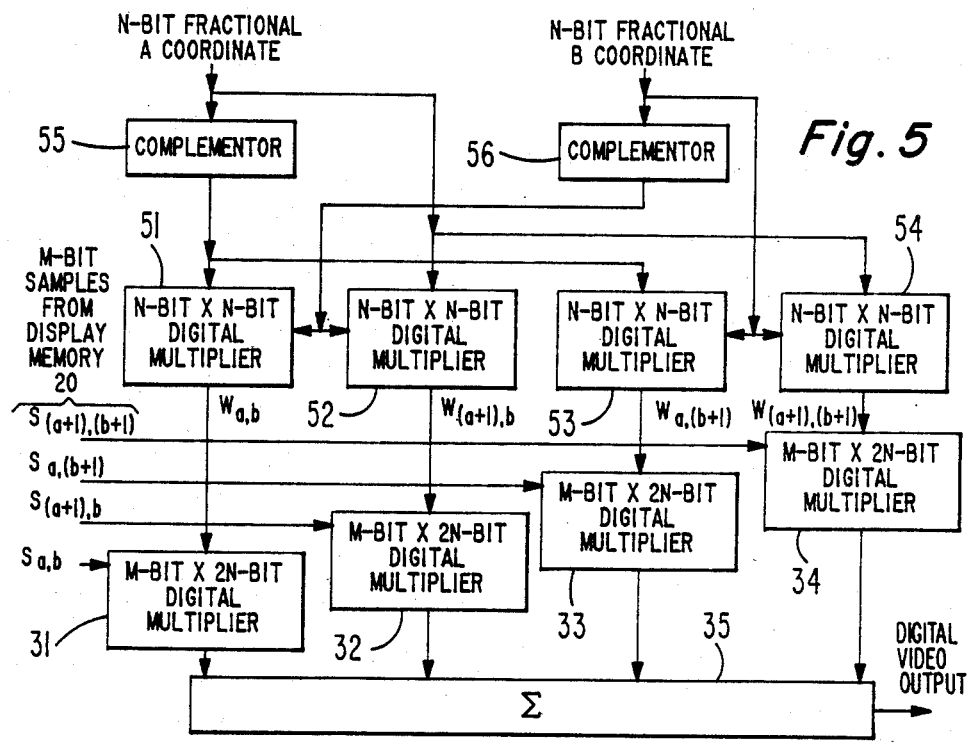
FIG. 5 is a block diagram of a weighted summation network in which the FIG. 3 weighting function is calculated rather than looked up from ROM.

The right-square-pyramid weighting function is also of particular interest because the function can be quite readily computed at video rate by calculation, eliminating in accordance with an aspect of the invention the rather large ROM needed for table look-up of the weighting function. FIG. 5 shows how this calculation, the nature of which flows from elementary geometric considerations, can be made. Multipliers 51, 52, 53, and 54 supply weighting coefficients $W_{a,b}$, $W_{(a+1),b}$, $W_{a,(b+1)}$ and $W_{(a+1),(b+1)}$, respectively, to multipliers 31, 32, 33, and 34, respectively. The terms frac a and frac b are complemented to $\overline{\text{frac a}}$ and $\overline{\text{frac b}}$ in complementors 55 and 56, respectively. Multiplier 51 calculates the weighting coefficient $W_{a,b}$ to be used with image sample point $S_{a,b}$ by multiplying together the $\overline{\text{frac a}}$ and $\overline{\text{frac b}}$ outputs of complementors 55 and 56. Multiplier 52 calculates $W_{(a+1),b}$ by multiplying together frac a and $\overline{\text{frac b}}$. Multiplier 53 calculates $W_{a,(b+1)}$ by multiplying together $\overline{\text{frac a}}$ and frac b. And multiplier 54 calculates $W_{(a+1),(b+1)}$ by multiplying together frac a and frac b. The digitized video output $V_{OUT}$ of summation network 35 is described, then, by the following equation.

$$V_{OUT} = (\overline{\text{frac }a})(\overline{\text{frac }b})S_{a,b} + \quad (1)$$

$$(\text{frac }a)(\overline{\text{frac }b})S_{(a+1),b} +$$

$$(\overline{\text{frac }a})(\text{frac }b)S_{a,(b+1)} +$$

$$(\text{frac }a)(\text{frac }b)S_{(a+1),(b+1)}.$$

The computation of weighting coefficient and the multiplication of four image sample points from memory 20 requires four n-bit by n-bit multipliers and, unless the number of bits m in the low-amplitude-resolution data from memory 20 be ONE, four m-bit by 2n-bit multipliers. This is a considerable amount of digital multiplication, and it is desirable to reduce the multiplier requirements through some form of network reduction taking advantage of the associative, commutative, and distributive properties of scalar multiplication. To this end equation 1 may be rewritten as follows:

$$V_{OUT} = (1 - \text{frac }a)(1 - \text{frac }b) S_{a,b} + \quad (2)$$

$$(\text{frac }a)(1 - \text{frac }b) S_{(a+1),b} + (1 - \text{frac }a)(\text{frac }b) S_{a,(b+1)} +$$

$$(\text{frac }a)(\text{frac }b) S_{(a+1),(b+1)}.$$

One rearrangement of equation 2 yields equation 3, following:

$$V_{OUT} = S_{a,b} + (\text{frac }a)(S_{(a+1),b} - S_{a,b}) + \text{frac }b \quad (3)$$

$$\{S_{a,(b+1)} + (\text{frac }a)(S_{(a+1)(b+1)} - S_{a,(b+1)}) -$$

-continued $$[S_{a,b} + (\text{frac }a)(S_{(a+1),b} - S_{a,b})]\}.$$

Only three different multiplications are required in equation 3, viz:

(a) an m-bit by n-bit multiplication (frac a) times $(S_{(a+1),b} - S_{a,b})$, (b) an m-bit by n-bit multiplication (frac a) times $(S_{(a+1),(b+1)} - S_{a,(b+1)})$, and (c) an (m+n)-bit by n-bit multiplication (frac b) times the braced terms.

Figure 6:
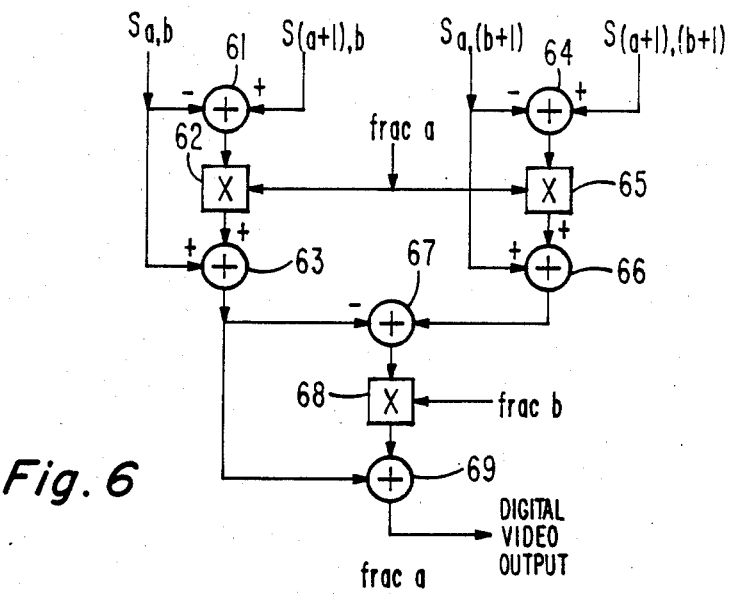

FIG. 6 shows a species of apparatus 30 for making a weighted summation according to the equation 3 algorithm.

In FIG. 6 the updated values for the image sample points $S_{a,b}$, $S_{(a+1)b}$, $S_{a,(b+1)}$ and $S_{(a+1),(b+1)}$ supplied from memory 20 during each of its read cycles are processed as follows. A subtractor 61 subtracts $S_{a,b}$ from $S_{(a+1),b}$, and the resulting difference is multiplied by frac a in an m-bit by n-bit multiplier 62 to obtain (frac a) $(S_{(a+1),b} - S_{a,b})$ for addition back to $S_{a,b}$ in an adder 63 to yield $S_{a,b}$+(frac a)$(S_{(a+1),b} - S_{a,b})$. Subtractor 64 subtracts $S_{a,(b+1)}$ from $S_{(a+1),b}$, and the resulting difference is multiplied by frac a in an m-bit by n-bit multiplier 65 to obtain (frac a)$(S_{(a+1),(b+1)} - S_{a,(b+1)})$ for addition back to $S_{a,(b+1)}$ in an adder 66 to yield $S_{a,(b+1)}$+frac a $(S_{(a+1),(b+1)} - S_{a,(b+1)})$. This output from adder 66 has the $S_{a,b}$+frac a $(S_{(a+1),(b)} - S_{a,b})$ output of adder 63 subtracted from it in a subtractor 67, and the resulting difference is multiplied by frac b in an (m+n)-bit by n-bit multiplier 68. The resulting product is then added back to the output of adder 63 in adder 64 to yield the $V_{OUT}$ of equation 3.

The FIG. 6 network superficially resembles a two-dimensional linear interpolator used in connection with interpolating between spatially adjacent sample points of a real image in broadcast television. However, the multiplication in multiplier 62 is not just the m-bit by m-bit multiplication required to resolve the gradation along a high-amplitude-resolution scale between two m-bit $S_{a,b}$ and $S_{(a+1),b}$ samples, nor is the multiplication in multiplier 65 just the m-bit by m-bit multiplication required to resolve the gradation along the same high-amplitude-resolution scale between two m-bit $S_{a,(b+1)}$ and $S_{(a+1),(b+1)}$ samples, nor is the multiplication in multiplier 68 just the m-bit by m-bit multiplication required to resolve two intermediate interpolation results to reach a final interpolation result on the same high-amplitude-resolution scale. The frac a and frac b items are afforded n-bit resolution, which is greater than the m-bit amplitude resolution of the image samples, and the high amplitude resolution of $V_{OUT}$ springs primarily from the n-bit spatial resolution rather than from the m-bit amplitude resolution of the original image samples. Put another way, frac a and frac b are carried to a number, n, of bits of spatial resolution, which number, n, is much larger than the number of bits, m, of amplitude resolution in the original image samples. The difference in the nature of the multiplication involved is pointed up by the fact that, whereas, in the interest of economy, the multiplications involved in the linear interpolation of real images should be "square"—i.e., so the multiplicand and multiplier have equal numbers of bits—the multiplication in multipliers 62 and 65 is not "square" but "rectangular"—i.e., the n bits in the frac a multiplier are greater in number than the m bits in the multiplicand. The rectangular nature of these multiplications can be exploited to gain multiplier speed.

Figure 7:
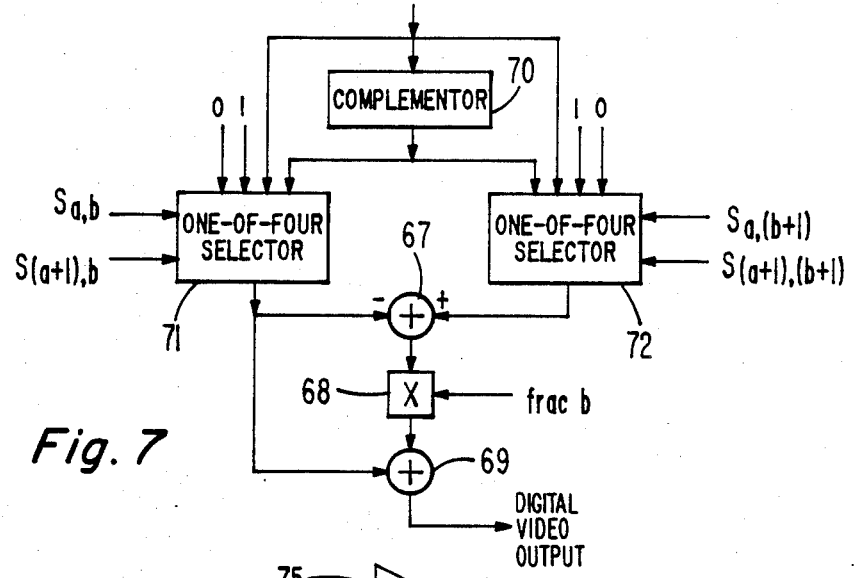

FIG. 7 shows a way the rectangular multiplications can be done very rapidly when m is unity-valued. A complementor 70 responds to frac a to supply $\overline{\text{frac a}}$. A one-of-four selector 71 responds to image samples $S_{a,b}$ and $S_{(a+1),b}$ both being ZERO to select ZERO for the $S_{a,b}+(\text{frac a})(S_{(a+1),b}-S_{a,b})$ term to be supplied to subtractor 67 as minuend and to adder 69; to $S_{a,b}$ and $S_{(a+1),b}$ both being ONE to select ONE for that term; to $S_{a,b}$ being ZERO and $S_{(a+1),b}$ being ONE to select frac a for that term, and to $S_{a,b}$ being ONE and $S_{(a+1),b}$ being ZERO to select $\overline{\text{frac a}}$ for that term. A one-of-four selector 72 responds to image samples $S_{a,(b+1)}$ and $S_{(a+1),(b+1)}$ both being ZERO to select ZERO for the $S_{a,(b+1)}+(\text{frac a})(S_{(a+1),(b+1)}-S_{a,(b+1)})$ term to be supplied as subtrahend to subtractor 67; to $S_{a,(b+1)}$ and $S_{(a+1),(b+1)}$ both being ONE to select ONE for that subtrahend term; to $S_{a(b+1)}$ being ZERO and $S_{(a+1),(b+1)}$ being ONE to select frac a for that subtrahend term, and to respond to $S_{a,(b+1)}$ being ONE and $S_{(a+1),(b+1)}$ being ZERO to select $\overline{\text{frac a}}$ for that subtrahend term.

Figure 8:
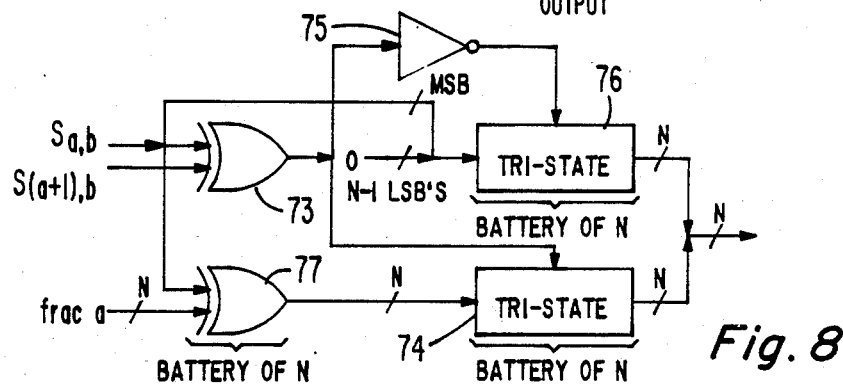

This selection logic may appear in several equivalent forms—e.g., that shown in FIG. 8. Consider particularly the operation of the FIG. 8 circuit as one-of-four selector 71. The exclusive-OR gate 73 responds with a ZERO output to $S_{a,b}$ and $S_{(a+1),b}$ both being either ONE or ZERO. This ZERO output applied to the enable inputs of a battery 74 of tri-states, n in number, to condition each of them to be in its high-output-impendance state and thus be ineffective in determining one-of-four selector output. The ZERO output of XOR gate 73 is inverted to ONE by inverter 75. This ONE applied to the enable inputs of a second battery 76 of tri-states, n in number, conditions each to be in a low-output-impedance state and to forward the signals applied to their signal inputs. The ONE or ZERO value of $S_{a,b}$ is forwarded as the most significant bit of battery 76 output, which is one-of-four selector output; and ZERO's are forwarded as the less significant bits.

XOR gate 73 responds to one of $S_{a,b}$ and $S_{(a+1)b}$ being ZERO and the other being ONE to supply an output ONE, which inverted to ZERO by inverter 75 conditions each of the battery 76 of tri-states to be in its high-output-impedance state and thus be ineffective in determining one-of-four selector output. The ONE output of XOR gate 73 applied to the enable inputs of battery 74 of tri-states condition them to forward the outputs of a battery 77, n in number, of XOR gates as one-of-four selector output. These XOR gates receive respective bits of frac a on their first inputs and receive $S_{a,b}$ on their second inputs. If $S_{a,b}$ be ZERO, frac a appears at the outputs of battery 77 of XOR gates to be forwarded by battery 74 of tri-states as one-of-four selector output. If $S_{a,b}$ be ONE, frac a is complemented by battery 77 of XOR gates, and battery 74 of tri-states forwards $\overline{\text{frac a}}$ as one-of-four selector output.

Figure 9:
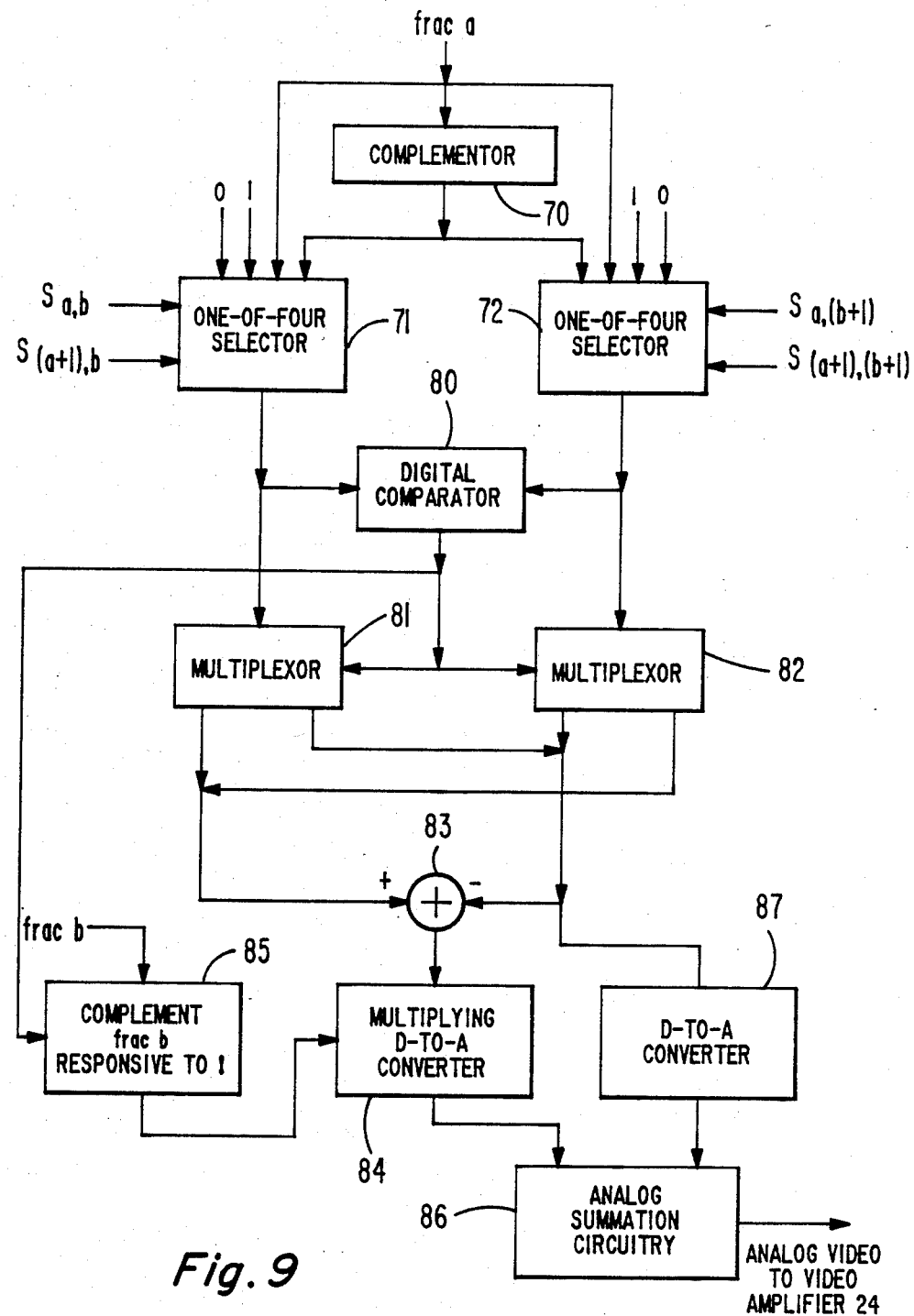

FIG. 9 shows how the FIG. 7 weighted summation network can be modified to avoid the need for digital multiplier 68. A digital comparator 80 develops a ONE output if the output of one-of-four selector 71 fails to exceed the output of one-of-four selector 72 in magnitude; otherwise comparator 80 develops a ZERO output. Multiplexors 81 and 82 respond to comparator 80 output to supply the larger of the selector 71 and 72 outputs as minuend and the smaller as subtrahend to subtractor 83. The difference between the minuend and subtrahend is supplied from subtractor 83 output to a first input of a multiplying digital-to-analog converter 84. Responsive to comparator 80 output, circuitry 85 selectively complements frac b to supply a second input of multiplying digital-to-analog converter 84, forwarding frac b without complementing when comparator 80 indicates selector 71 output magnitude fails to exceed selector 72 output magnitude, and forwarding frac b when comparator 80 indicates selector 71 output magnitude exceeds selector 72 output magnitude. The analog output of converter 84 is then added in analog summation circuitry 86 to the analog output of a standard digital-to-analog converter 87, which converts to analog form the smaller of the selector 71 and 72 outputs supplied its input from multiplexor 81 or 82 output. The summed analog signals are then applied to the input of video amplifier 24 of FIG. 1 without need for conversion by digital-to-analog converter 23.

The multiplexing afforded by multiplexors 81 and 82 and the selective complementing of frac b by circuitry 85 accommodate the first quadrant restriction on multiplication by multiplying digital-to-analog converter 84. But also, it avoids the need for subtracting terms derived by parallel digital-to-analog conversion processes, which would tend to emphasize conversion inaccuracies in low video inputs.

The advantages of multiplying digital-to-analog conversion can be extended to cascaded first-quadrant multiplications. Accordingly, the cascaded multiplications performed in FIG. 5 by multipliers 51 and 31, by multipliers 52 and 32, by multipliers 53 and 33, and by multipliers 54 and 34 can each be carried out in a three-input multiplying digital-to-analog converter; and the digital summation by network 35 can then be replaced by circuitry for performing linear summation of the multiplying digital-to-analog converters. The four three-input multiplying digital-to-analog converters can also be integrated and arranged to work into a common load impedance performing the linear summation of their respective contributions to a single output for application to the input of video amplifier 24.

The FIG. 10 apparatus is used in generating a video signal describing a line parallel (in a,b image space) to a-coordinate axis. The int a and int b outputs of scan converter 21 are supplied to circuits 91 and 92, respectively, to have a ONE added to each of them. The outputs of circuits 91 and 92 are, then, (1+int a) and (1+int b) respectively.

The a coordinates of the beginning and end points of the line are $L_1$ and $L_2$, respectively. Digital comparator 93 supplies a ONE output only when int a applied to one of the inputs exceeds $L_1$ applied to the other of its inputs, and digital comparator 94 supplies a ONE output only when int a applied to one of its inputs is equal to or is less than $L_2$ applied to the other of its inputs. An AND gate 95 responds with a ONE only when both comparators 93 and 94 outputs are ONE's, to provide an indication that int a is in the range bounding the line. Digital comparators 96 and 97 provide a comparison of (1+int a) to $L_1$ and $L_2$ analogous to the comparison of int a to $L_1$ and $L_2$ provided by comparators 93 and 94, and an AND gate 98 supplies a ONE output indication if (1+int a) is in the range bounding the line.

Decoder 99 decodes int b equalling T to specify by ONE or ZERO output whether or not a one-pixel-wide unbounded line of which the bounded line is a segment passes through a value T of (int b)-coordinate, and decoder 100 decodes 1+int b equalling T to specify by ONE or ZERO output whether or not the one-pixel-wide unbounded line passes through a value of T of (1+int b)-coordinate. If the unbounded line is to be two pixels wide, decoders 99 and 100 can detect int b and (1+int b) with their least significant bits suppressed equaling a value T with one less place; if the unbounded line is to be four pixels wide, decoders 99 and 100 can detect int b and (1+int b) with the two least significant bits of each suppressed equalling a value T with two less places; etc. The positional resolution of such thicker lines can be maintained, where needed, by adding equal offsets to int b and (1+int b) before shifting their binary points and decoding them.

The four-sample points $S_{a,b}$, $S_{(a+1),b}$, $S_{a,(b+1)}$, $S_{(a+1),(b+1)}$ are supplied at the outputs of AND gates 101, 102, 103, and 104, respectively. AND gate 101 supplies an output ONE only when AND gate 95 indicates int a to be in the a-coordinate range of the line and T decoder 99 indicates int b to be the b-coordinate of the line. AND gate 102 supplies an output ONE only when AND gate 98 indicates (1+int a) to be in the a-coordinate range of the line and T decoder 99 indicates int b to be the b-coordinate of the line. AND gate 103 supplies an output ONE only when AND gate 95 indicates int a to be in the a-coordinate range of the line and T decoder 100 indicates (1+int b) to be the b-coordinate of the line. AND gate 104 supplies an output ONE only when AND gate 98 indicates (1+int a) to be in the a-coordinate range of the line and T decoder 100 indicates (1+int b) to be the b-coordinate of the line.

The FIG. 11 apparatus is used in generating a video signal describing an area which in a,b image space is bounded by lines parallel to the a-coordinate axis and parallel to the b-coordinate axis. The T decoder 99 of FIG. 10 is replaced by digital comparators 113 and 114, and an AND gate 115 which determine whether or not int b lies between the limit values $L_3$ and $L_4$ specifying the b-coordinate range of the area; and the T decoder 100 of FIG. 10 is replaced by digital comparators 116 and 117 and an AND gate 118, which determine whether or not (1+int b) lies between $L_3$ and $L_4$. Additional logic will allow the adaptation of the FIG. 11 apparatus to describe areas with more complex conforming boundaries than the square in a, b image space.

Consider now how a complex display can be generated with a set of very compact image memories read with assorted phantom raster scans. Complex displays for video games or for special-purpose-computer graphic displays can utilize the invention, for example, but the use to be described includes a cluster of the four most-used flight instruments in an aircraft, which will be displayed in a cluster, all on one raster-scanned CRT screen.

FIG. 12 shows in somewhat simplified form the display appearing on the screen of the raster-scanned cockpit kinescope. The usual practice with cockpit instrumentation has been to use individual small CRT's for each indicator function. Consolidating the indicators into one raster-scanned display permits the use of a broadcast television receiver kinescope for the display (using the over-square horizontal scan to accumulate other display material at the sides of the instrument cluster, if desired), eliminates need for replicating sweep circuitry for each indicator, avoids the problems of providing electromagnetic shielding between the deflection coils of adjacent displays, and can result in a more compact console.

The FIG. 12 display is written against a magenta background mat. The active portions of the display are surrounded by a square perimeter of yellow line and subdivided into quadrants by horizontal and vertical yellow lines. The upper-left quadrant is an attitude director indicator (ADI); the upper-right quadrant, a horizontal situation indicator (HSI); the lower-left quadrant, an airspeed indicator; and the lower-right quadrant, an altimeter.

The ADI in the upper-left quadrant of the FIG. 12 display has at its center a representation in green of the wings and fuselage of an aircraft, which does not change position on screen as a yellow artificial horizon line through the zeros translates and rotates "behind" it responsive to pitch and roll information from gyroscopes. The climb and dip gradations (scaled −30 to +20 for the attitude disposition shown in FIG. 12), in green, always parallel this artificial horizon line. The background within the circle is cyan above the artificial horizon line and brown below it, and a red bank indicator needle extends generally upward normal to the artificial horizon line. The bank gradations around the circular dial and the circle defining the dial are green and do not rotate or translate position on screen. The area surrounding the circle in the ADI is, except for the bank gradations, the same magenta as background mat.

The HSI in the upper-right quadrant of the FIG. 12 display has a green stylized top view of an airplane in fixed position in its center. A yellow compass rose circled by yellow numerals rotates about the center of the HSI quadrant responsive to gyrocompass heading, and the remainder of the quadrant is the same magenta as background mat.

The airspeed indicator in the lower-left quadrant uses a green dial circle and airspeed indication numerals in fixed positioning. Progressing anticlockwise from top, the dial is lined with a red arc over a range of excessive airspeeds, a yellow arc over a range of airspeeds safe in still air, and a green arc over the range of normal cruising airspeeds. A still further, inner arc of white indicates the range of airspeeds in which the flaps may be lowered. The airspeed indicator hand, rotatably positioned responsive to airspeed, is in red; and the red arc flashes on and off when this hand overlies it. The rest of its quadrant is the same magenta as background mat.

The altimeter in the lower-right quadrant of FIG. 12 display uses a green dial circle and surrounding numerals in fixed positioning. The ten-thousand-foot, thousand-foot, and hundred-foot hands, which rotate about center of the quadrant responsive to barometer or radio altimeter, are progressively longer and are green, yellow and red, respectively. The Kollsman window and the barometric pressure numerals therein are in yellow. The remainder of the quadrant is the magenta of background mat.

The organization of image memory and phantom raster generation for the FIG. 12 display will now be described with reference to FIGS. 13-20.

Figure 13:
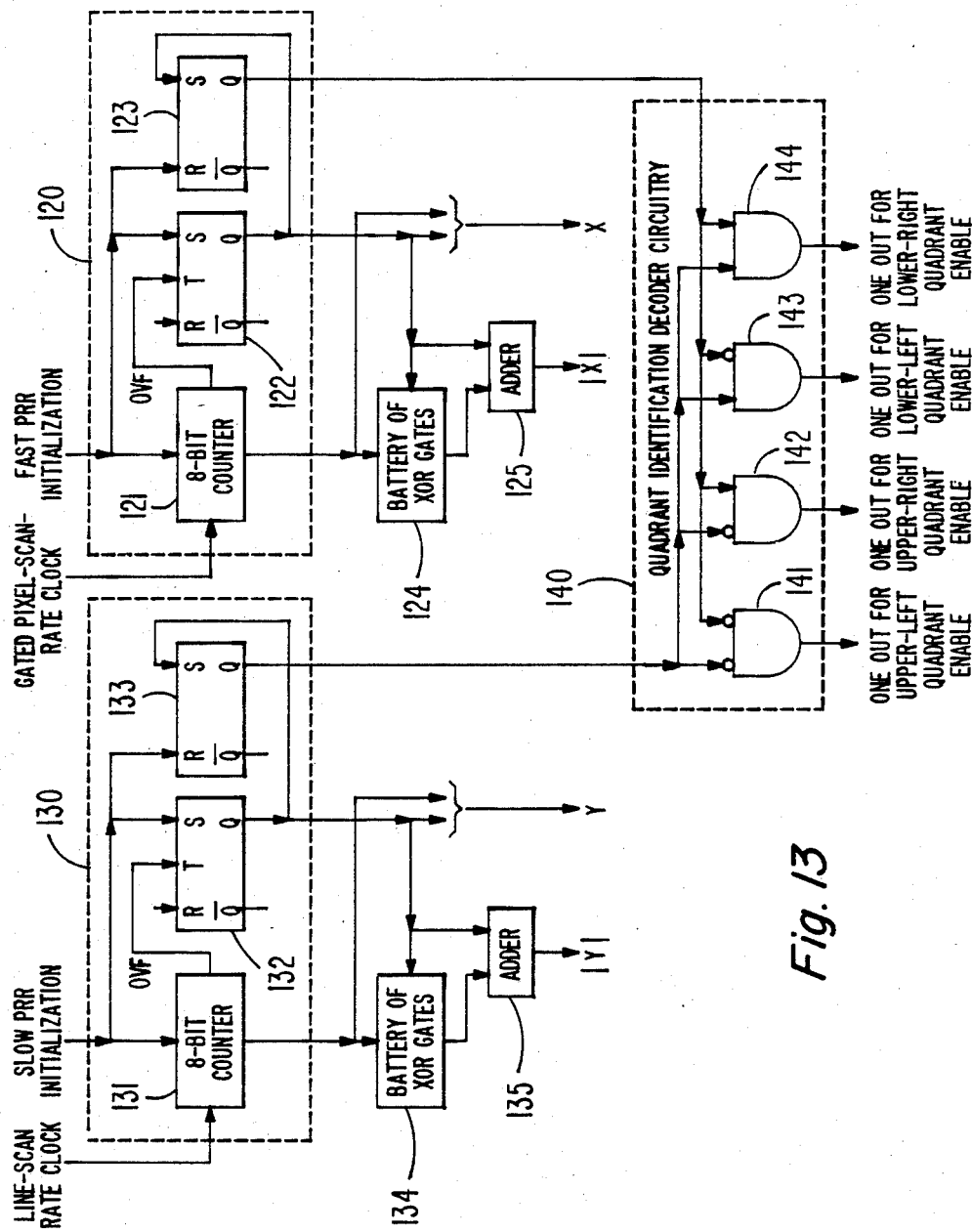

FIG. 13 shows the x-address-scan generator 120 and y-address-scan generator 130 at its upper-right and upper-left corners, respectively. In accordance with television practice a left-hand coordinate system is used, with the positive x axis extending to the right on display screen as viewed and with positive y axis extending downward. The portion of the display screen in which the FIG. 12 display is depicted will be assumed to be 511 scan lines in the vertical dimension; and each of these scan lines will be subdivided into 511 pixels, so that horizontal resolution and vertical resolution of the graphic image are alike. To this end, during the trace portion of each line scan 511 regularly spaced pulses forming a GATED PIXEL SCAN RATE CLOCK signal are supplied to x-address-scan generator 120, and during the trace portion of each field 511 pulses are supplied each horizontal retrace interval to y-address-scan generator 130 as a LINE SCAN RATE CLOCK signal.

Scan generator 120 generates the x coordinate of raster scan in two's complement form within both the left half and the right half of the display, the most significant bit being provided by the Q output of a triggerable set-reset flip-flop 122 and the less significant bits by the output of an 8-bit counter 121. The output of counter 121 is reset to all ZERO's and the Q output of flip-flop 122 is set to ONE by a FAST PRR INITIALIZATION pulse provided each scan line just prior to the time the display raster scan crosses the left edge of display; the pulse also resets to ZERO the Q output of a set-reset flip-flop 123 used to indicate whether the left half or right half of the display is being scanned. ("PRR" is the abbreviation of "pulse repetition rate".) The carry output of counter 121 is used to trigger Q output of the flip-flop 122 to ZERO as the vertical center-line of each display quadrant is reached during trace and to trigger Q output of the flip-flop 122 to ONE as the vertical center-line of the entire FIG. 12 display is reached during trace, in furtherance of generating x coordinate in two's complement form within both the left and right halves of the display. Q output of flip-flop 123 is set to ONE by the Q output of flip-flop 122 going to ONE as center of line scan is reached.

Analogously, scan generator 130 generates the y coordinate of raster scan in two's complement form within both the top half and bottom half of the display, the most significant bit being provided by the Q output of a triggerable set-reset flip-flop 132 and the less significant bits by the output of an 8-bit counter 131. Counter 131 counts LINE SCAN RATE CLOCK signals, rather than the GATED PIXEL SCAN RATE CLOCK signals counted by counter 121; and its output is set to all ZERO's by a SLOW PRR INITIALIZATION pulse provided just prior to the beginning of each field, which pulse also sets the Q output of flip-flop 132 to ONE and resets the Q output of flip-flop 133 to ZERO. The carry output of counter 131 triggers Q output of flip-flop 132 to ZERO when the horizontal center-line of each display quadrant is reached, and it triggers Q output of flip-flop 132 to ONE as the horizontal center-line of the entire FIG. 12 display is reached. Q output of flip-flop 133 is set to ONE by the Q output of flip-flop 132 going to ONE as the horizontal center of the entire display is reached.

The absolute values $|x|$ and $|y|$ of x and y coordinates are useful for addressing memories storing information symmetrical about the x-equals-zero and y-equals-zero axes of each display quadrant. The x output of 8-bit counter 121 is applied to the first inputs of a battery 124 of exclusive-OR gates, the second inputs of which are parallelly connected to receive Q output of flip-flop 122. Q output of flip-flop 122 is added in an adder 125 to the binary number provided by the outputs of the battery 134 of XOR gates, incrementing it by unity when x is negative-valued. Adder 125 output is, then, $|x|$. A battery 134 of XOR gates and an adder 135 are connected analogously to 124, 125 for deriving $|y|$.

The Q outputs of flip-flop 133 and 123 provide two-bit identification numbers of the quadrants of the entire FIG. 12 display, being both ZERO in the upper-left quadrant, being ZERO and ONE respectively in the upper right-quadrant, being ONE and ZERO respectively in the lower-right quadrant, and being both ONE in the lower right quadrant. These two bits are applied as inputs to quadrant identification decoder circuitry 140. Quadrant decoder 141 in circuitry 140 responds only to both bits being ZERO to provide a ONE indicative of raster scan passing through the upper-left quadrant of the display screen. Quadrant decoder 142 in circuitry 140 supplies ONE indicative of raster scan passing through the upper-right quadrant of the display screen. Quadrant decoders 143 and 144 supply ONE's when raster scan passes through the lower-right quadrant and through the lower-left quadrant respectively. The outputs of quadrant decoders 141, 142, 143 and 144 are used as read-enable signals for enabling memories and comparators to supply video for display only in an appropriate quadrant; the particulars of this will be treated at suitable points later on in the specification.

The center of each display quadrant around which respective rotations are to be performed is defined by an all-ZERO two's-complement x and y coordinates, the respective most significant bits of which are provided by the Q outputs of flip-flops 122 and 132 respectively, and the respective less significant bits by counters 121 and 131 respectively. Defining the display coordinates in a display region to be rotated, so that all bits are ZERO at the center of rotation, is an aspect of the invention. It provides a much simplified basis for calculating phantom raster scan coordinates according to transformation equations. Note, too, that where the centers of rotation are separated by integral powers of two, as here, the bases for these coordinate systems can be generated by simply considering only portions of the outputs of x-and y-coordinate counters for transformation to phantom raster coordinates and using the remaining portions of those outputs to generate read-enable signals for keying into video drive for the CRT the outputs of memories and comparators responding to those phantom raster coordinate inputs. Centers of rotation separated by numbers of pixels or lines that are not integral powers of two can be accommodated by suitably resetting the counters and flip flops generating x and y coordinates in two's complement form, during their normal counting cycles, rather than allowing them to count through a plurality of complete cycles.

Figure 14:
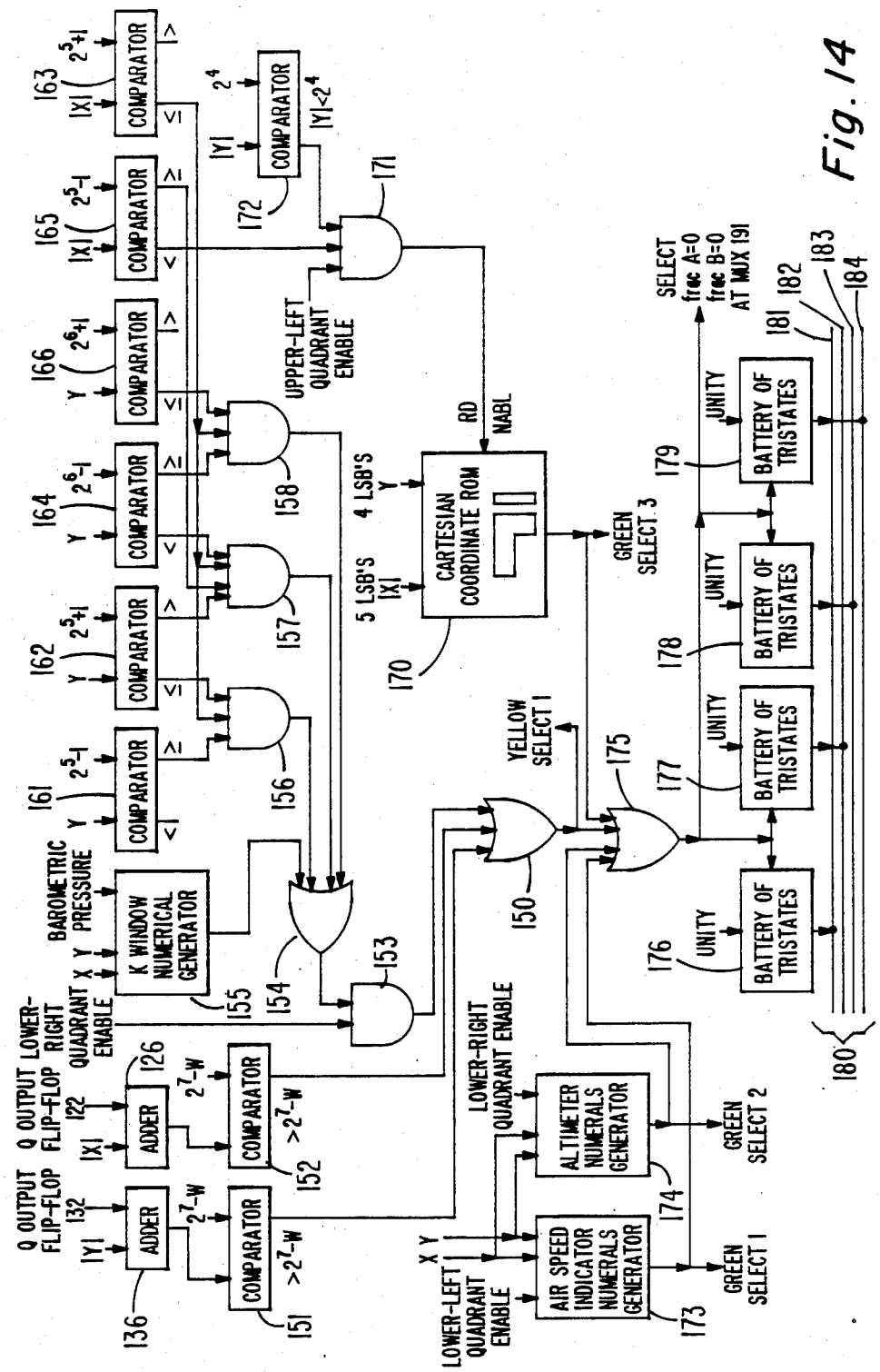

FIG. 14 shows the circuitry for generating the static portions of the FIG. 12 display. The yellow square forming the perimeter of the display and the yellow horizontal and vertical lines dividing it into quadrants can be considered as a single graphic image. This borderline graphic image is drawn on display screen in response to an OR gate 150 receiving a ONE from either of comparators 151 and 152. An adder 126 adds the Q output of flip-flop 122 to $|y|$ to furnish input to comparator 151 for comparison to $2^7-w$, w being the width of the borderlines, a ONE being forwarded to OR gate 150 when adder 126 output exceeds $2^7-w$ to generate vertical borderlines. An adder 136 adds the Q output of flip-flop 132 to $|x|$ to furnish input to comparator 152 for comparison to $2^7-w$, a ONE being forwarded to OR gate 150 when adder 136 output exceeds $2^7-w$ to generate horizontal borderlines.

OR gate 150 has a third input from the output of an AND gate 153 which goes to ONE in the lower-right quadrant when the Kollsman window and the barometric pressure numerals therein are to be written. AND gate 153 receives as one of its inputs the LOWER-RIGHT QUADRANT ENABLE indication from AND gate 144 in the FIG. 13 quadrant indentification decoder circuitry 140, so can only supply ONE output in the lower-right quadrant of the display. The other input to AND gate 153 is from an OR gate 154 furnishing output ONE responsive to a ONE from numeral generator 155 when a barometric pressure indication is being written on the display screen or from one of the AND gates 156, 157, and 158 when portions of the upper boundary, lower boundary or one of the side boundaries of the Kollsman window are being written on the display screen.

Numeral generator 155 typically comprises the ten digits stored in ROM's raster-scanned by the less significant bits of x and y, which ROM's are selectively supplied READ ENABLE signals responsive to two of the more significant bits of x and to a barometric pressure indication code. Generator 155 will also include means responsive to x, y for decoding the position of the decimal point in the pressure reading. The upper boundary of the Kollsman window is written on the display screen when AND gate 156 furnishes a ONE output responsive to a comparator 161 indicating y is equal or more than $2^5-1$, to a comparator 162 indicating y is less than or is equal to $2^5+1$, and to a comparator 163 indicating $|x|$ is less than or is equal $2^5+1$. The side boundaries of the Kollsman window are written on the display screen when AND gate 156 furnishes a ONE output responsive to comparator 162 and a comparator 164 indicating y lies between $2^5+1$ and $2^6-1$, to a comparator 165 indicating $|x|$ is equal to or greater than $2^5-1$, and to comparator 163 indicating $|x|$ is less than or equal to $2^5+1$. The lower boundary of the Kollsman window is written on the display screen when AND gate 156 furnishes a ONE output responsive to comparator 164 indicating y is equal to or greater than $2^6-1$, to a comparator 166 indicating y is less than or equal to $2^6+1$, and to comparator 163 indicating $|x|$ is less than or equal to $2^5+1$.

Information for writing the green stylized silhouette of the rear-view of an aircraft in the middle of the ADI appearing in the upper-left of the FIG. 12 display is stored in ROM 170. The information is stored in folded form with ROM 170 being addressed responsive to $|x|$, rather than x, to provide symmetrical right and half displays from the same storage locations, twice-read. To reduce the number of storage locations in it, ROM 170 can be addressed with the five least significant bits of $|x|$ and the four least significant bits of y, with the ROM selectively provided READ ENABLE signal so read-out is supplied only in center screen. Suitable READ ENABLE signal is provided by the output of an AND gate 171 receiving UPPER-LEFT QUADRANT ENABLE as a first of its inputs, indications from comparator 165 indicative that $|x|$ is less than $2^5-1$ to suppress spurious side images, and indications than y is less than $2^4$ to suppress remaining spurious images above and below the desired image on screen.

The green airspeed indicator and altimeter numerals are generated in x and y coordinates by generators 173 and 174, respectively, in the lower-left and lower-right quadrants responsive to x, y and the appropriate quadrant enable signal. These numeral generators can essentially comprise ROM's and logic to provide them appropriate READ ENABLE signals. These numerals are stored in Cartesian coordinates for the sake of uniformity when reading from a single-bit-output ROM. But, instead, the numerals could be stored together with dial circle information in a plural-bit-output ROM, to simplify reduction of the number of addresses in ROM and subsequent selective reading of the ROM.

The non-coincident non-gray-scale video outputs of OR gate 150, of ROM 170 and of generators 173 and 174 are applied as inputs to an OR gate 175, as well as being supplied as color selection signals. OR gate 175 supplies ONE or ZERO output indicative of whether graphic image or background mat is to be presented in the display. To facilitate multiplexing non-gray-scale video signal with gray scale video signals, the output of OR gate 175 is applied to the inputs of batteries 176, 177, 179, and 179 of tristates to condition them to selectively clamp to unity video level (i.e. full video drive level) a set 180 of four parallel-bit-buses 181, 182, 183, 184 to the input of a weighted summation network 190 appearing in FIG. 19. A video level multiplexor to network 190 is implemented by selectively applying from any of a number of sources four video level samples from low source impedance to busses 181, 182, 183, 184. Batteries 176, 177, 178 and 179 of tri-states supply unity video level at low source impedances to busses 181, 182, 183, and 184 respectively, responsive to OR gate 175 output being a ONE, but tri-states in these batteries have high source-impedance outputs responsive to OR gate 175 output being a ZERO. The output of OR gate 175 being a ONE is also used to condition a further multiplexor 191 to select ZERO values for the frac a and frac b inputs to weighted summation network 190, elements 190 and 191 being shown in FIG. 19.

Figure 15:
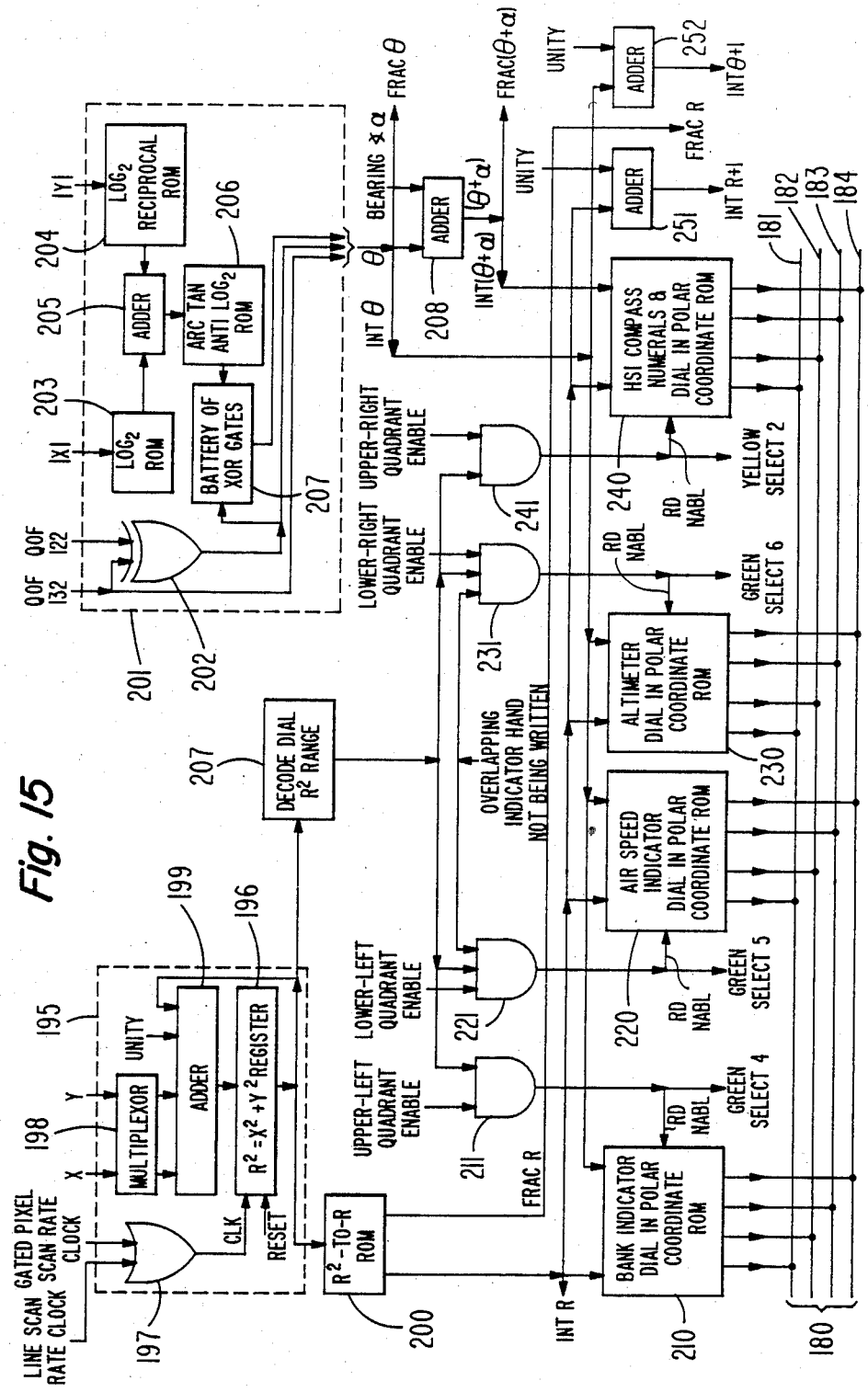

FIG. 15 shows the circuitry for generating phantom raster scan in radial and angular polar coordinates, r and θ, and ROM circuitry addressed in these coordinates, used for storing portions of the display such as dial circles. Circuitry for generating raster scan in polar coordinates is described in detail in U.S. Pat. No. 4,415,928 issued 15, Nov. 1983 to C. H. Strolle, T. R. Smith and G. A. Reitmeier; entitled CALCULATION OF RADIAL COORDINATES OF POLAR COORDINATE RASTER SCAN; and assigned to RCA Corporation. A brief description follows.

An accumulator 195 develops $r^2$ from x and y, accumulating $2x+1$ for every pixal advance in line scan of the display raster and $2y+1$ for every line advance in field scan. The accumulator includes an output register 196 for storing $r^2=x^2+y^2$, an OR gate 197 for responding to each pulse of the LINE SCAN RATE CLOCK and GATED PIXEL SCAN RATE CLOCK to provide a clock pulse to register 196, a multiplexor 198 selecting x or y for one-bit shift in all places to be followed by a ONE for obtaining $2x+1$ or $2y+1$, an adder 199 for adding the $2x+1$ or $2y+1$ term to the previous register 196 output upon clocking of its output into register 196 as update. Register 196 is reset to all ZERO's by the SLOW PRR INITIALIZATION pulse just before the beginning of field scan so its contents are all ONE's at upper left corner of the active display and the all ONE's condition is restored at the corners of each display quadrant. ROM 200 provides a square-root look up table responding to the more significant bits of $r^2$ to provide r over the range of interest.

The angular coordinate θ is generated by circuitry 205. The most significant bit of θ indicative of the half plane in which the angle reposes is taken directly from the Q output of flip-flop 132 of FIG. 13. (In the left-hand coordinate system $\theta=0$ extends to right and $\theta=\pi/2$ extends downward.) The secondmost significant bit, which together with the most significant bit specifies the quadrant in which $\theta$ reposes, is supplied from an XOR gate 202 responsive to the Q outputs of flip-flops 132 and 122 of FIG. 13. The less significant bits of $\theta$ indicative of the position within specified quadrant, is developed using ROM's 203 and 204 responsive to their respective $|x|$ and $|y|$ inputs to provide logarithms-base-two of $|x|$ and of the reciprocal of $|y|$ as respective outputs, adding those outputs in an adder 205, using ROM 206 to provide the arc tangent of the antilog of adder 205 output, and selectively complementing the output of ROM 206 in a battery 207 of XOR gates responsive to the output of XOR gate 202 being a ONE, which battery 207 of XOR gates forwards the output of ROM 206 without complementing responsive to the output of XOR gate 202 being a ZERO.

The integral portions int r and int $\theta$ of the calculated r and $\theta$ coordinates are used as inputs for ROM's 210, 220, and 230. The fractional portions frac r and frac $\theta$ are supplied as inputs to a fractional coordinate multiplexor 191 shown in FIG. 19. Supressing the more significant bits of int r in the inputs to ROM's 210, 220, and 230 reduces the requirement as to number of storage locations. ROM 210 stores the green circle surrounding the ADI in the upper-left quadrant of the display screen, and it stores the green bank indications radiating from this circle. ROM 220 stores the green dial circle and airspeed tick-marks for the airspeed indicator in the lower-left quadrant of the display. ROM 230 stores the green dial circle and elevation tick-marks for the altimeter in the lower-right quadrant of the display.

AND gates 211, 221, and 231 selectively furnish ONE's as READ ENABLE signals to ROM's 210, 220, and 230, respectively. The $r^2$ output of register 196 is supplied to decoder circuitry 207 which furnishes a ONE output for $r^2$ values in the range defining the annuli wherein repose the information stored in ROM's 210, 220, and 230. This ONE is furnished as an input to each of AND gates 211, 221 and 231 to prevent ROM's 210, 220, and 230 being multiply read, as would otherwise occur owing to the inputs of these ROM's receiving r coordinate with its more significant bits suppressed.

AND gate 211 receives as the second of its two inputs the UPPER-LEFT QUADRANT ENABLE signal from AND gate 141 of FIG. 13 so the circle and the bank indications for the ADI appear only when the upper left quadrant is scanned. Analogously, AND gates 221 and 231 respectively receive LOWER-LEFT QUADRANT ENABLE and LOWER-RIGHT QUADRANT ENABLE signals from AND gates 143 and 144 of FIG. 13 as the second of their respective three inputs. The third input to AND gate 221 is a ZERO if the airspeed indicator hand is being written at that time or a ONE if it is not. Similarly, the third input to AND gate 231 is a ZERO if the one-hundred-foot hand of the altimeter is being written at that time or a ONE if it is not.

A ROM 240 is used to store the yellow compass rose and numerals of the HSI. ROM 240 is selectively supplied READ ENABLE signals in the form of ONE's from the output of an AND gate 241. AND gate 241 receives the output of decoder circuit 207 as a first of its two inputs, facilitating the partial addressing of ROM 240 in r coordinates with the more significant bits suppressed to reduce the number of storage locations in the memory, and receives UPPER-RIGHT QUADRANT ENABLE signals supplied from AND gate 142 of FIG. 13. The input to ROM 240 in addition to bits of r coordinate contains bits from the output of an adder 208 which adds a bearing angle $\alpha$ to $\theta$ coordinate. This bearing angle is typically supplied by a synchro-to-digital converter driven from the synchro of the gyrocompass in the aircraft.

ROM's 210, 220, 230, and 240 are all of a type providing four video samples in parallel when read out. The four samples from each ROM are applied to respective ones of busses 181, 182, 183, and 184, which set 180 of busses supplies the input of weighted summation network 190. The outputs of AND gates 211, 221, 231, and 241 are forwarded as GREEN SELECT 4, GREEN SELECT 5, GREEN SELECT 6 and YELLOW SELECT 2 signals respectively. Adder 251 adds unity to int r, the integral portion of r coordinate, to provide in $r+1$, and adder 252 adds unity to int $\theta$, the integral portion of $\theta$ coordinate, to provide int $\theta+1$.

Figure 16:
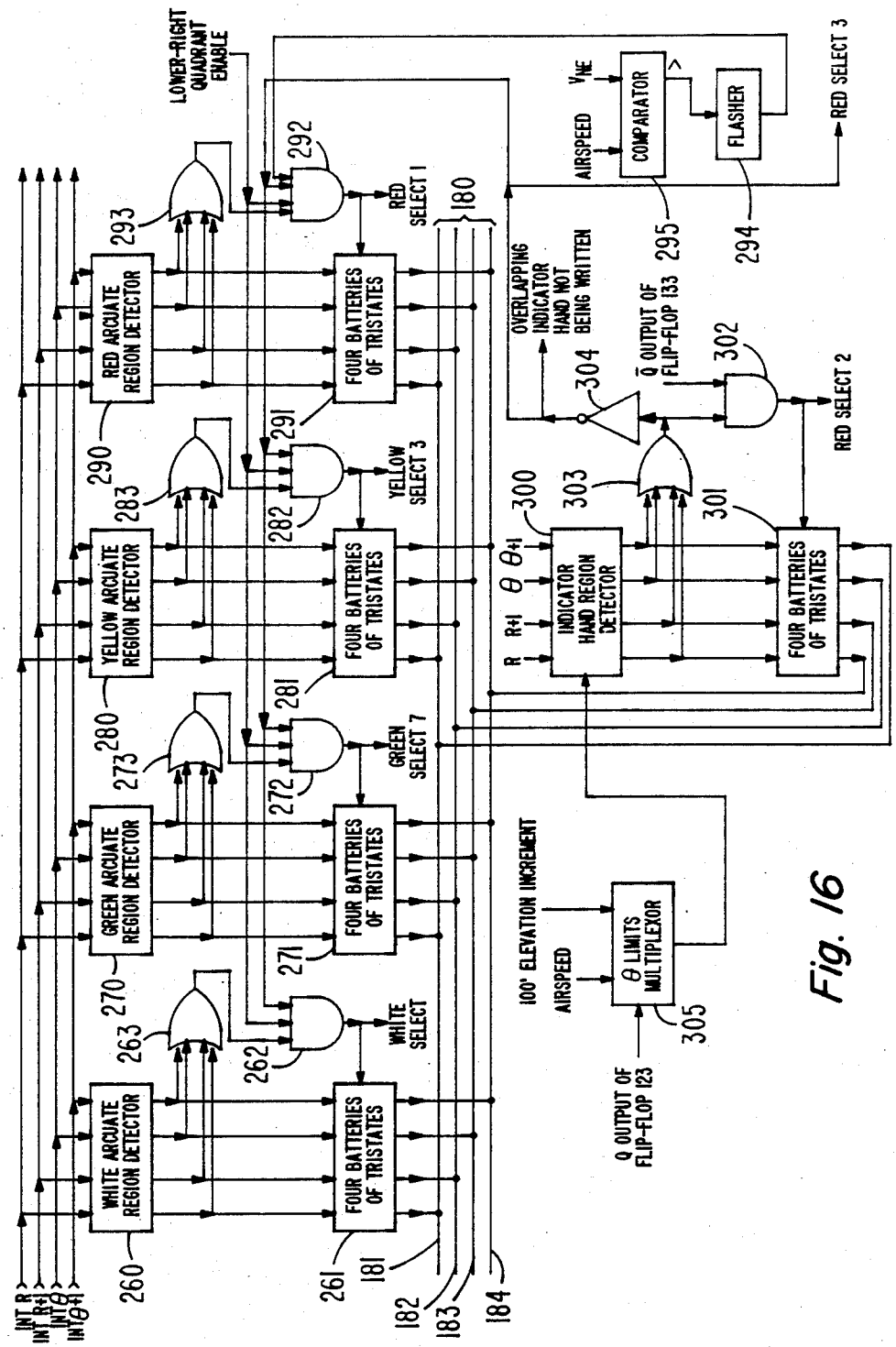

FIG. 16 shows circuitry for generating the arcuate regions inside the dial circle of the airspeed indicator the airspeed indicator hand and the one-hundred-foot altimeter hand. This circuitry includes detectors 260, 270, 280, 290, 300 to which int r, int $(r+1)$, int $\theta$ and int $(\theta+1)$ are supplied as inputs. These detectors are of the type described in connection with FIG. 11.

Detector 260 detects the white arcuate region in polar coordinate space identifying speeds where flaps may be lowered. The four video samples from detector 260 are applied by respective ones of a set 261 of four batteries of tri-states to respective ones of the set 180 of busses 181, 182, 183, 184 which supply the input of weighted summation network 190. These tri-states are conditioned to make this application from low-source impedances only when a ONE output is supplied from an AND gate 262. AND gate 262 receives three inputs, the first of which inputs is the LOWER-LEFT QUADRANT ENABLE signal from AND gate 142 of FIG. 13, the second of which inputs is a ZERO or ONE dependent on whether or not the airspeed indicator hand is being written in the region of polar coordinate image space where phantom raster scan presently is at, and the third of which inputs is from the output of an OR gate 263 receptive of the four output video samples from detector 260.

Analogously, information concerning the green arcuate region associated with normal cruise speeds is supplied to busses 181, 182, 183 and 184 by detector 270, a set 271 of four batteries of tri-states, an AND gate 272 and an OR gate 273. Also, analogously, information concerning the yellow arcuate region associated with still airspeeds is supplied to busses 181, 182, 183, and 184 by detector 280, a set 281 of four batteries of tri-states, an AND gate 282 and an OR gate 283. Information concerning the red arcuate region associated with speeds above a never-exceed velocity, $V_{NE}$, is supplied to busses 181, 182, 183 and 184 by detector 290, a set 291 of four batteries of tri-states, an AND gate 292, and an OR gate 293. AND gate 292 is a four-input AND gate in contrast to AND gates 262, 272, 282. A binary number descriptive of airspeed is compared to $V_{NE}$ in a digital comparator 295, and an indication that airspeed exceeds $V_{NE}$ conditions a flasher circuit 294, which normally supplies a ONE to the fourth input of AND gate 292, to alternately supply ONE and ZERO instead. Flasher circuitry 294 can be constructed using an astable multibivibrator with output selectively clamped to ONE condition by comparator 295 indicating airspeed does not exceed $V_{NE}$.

The airspeed indicator hand and altimeter one-hundred-foot hand are written similarly to the arcuate regions except θ excursion across the breadth of the hand is relatively very small and r excursion along its length is relatively long. The phantom raster scan of the region to be occupied by the hand is detected by detector 300, resembling detectors 260, 270, 280, 290 except that there is programming of the limits of the angular coordinates defining the breadth of the hand. The four video samples supplied by detector 300 are selectively applied to busses 181, 182, 183 and 184 from low source impedances by a battery 301 of tri-states responsive to AND gate 302 output being ONE. This can occur only on the bottom half of display when Q output of flip-flop 133 supplied as one input to this two-input AND gate is ONE. The other input to AND gate 302 is from OR gate 303 receiving as its inputs the video sample outputs of detector 300. OR gate 303 supplies a ONE output only when the indicator hand is to be written on screen. Its ZERO output is inverted in a logic inverter 304 to obtain a ONE output indicative of overlapping indicator hand not being written for application to inputs of AND gates 221 and 231 of FIG. 15 and 262, 272, 282 and 292 of FIG. 16, as well as to the input of AND gate 302. The programming of the θ-coordinates of hand position is controlled by the output of a multiplexor 305 which selects airspeed or one-hundred-foot elevation increment for programming depending on which half of the display screen is being written, as indicated by output from flip-flop 173.

ONE outputs of AND gates 262, 272, 282, 292 and 302 are also used as WHITE SELECT, GREEN SELECT 7, YELLOW SELECT 3, RED SELECT 1 and RED SELECT 2 signals, respectively, in the controlling of the color of display screen.

Figure 17:
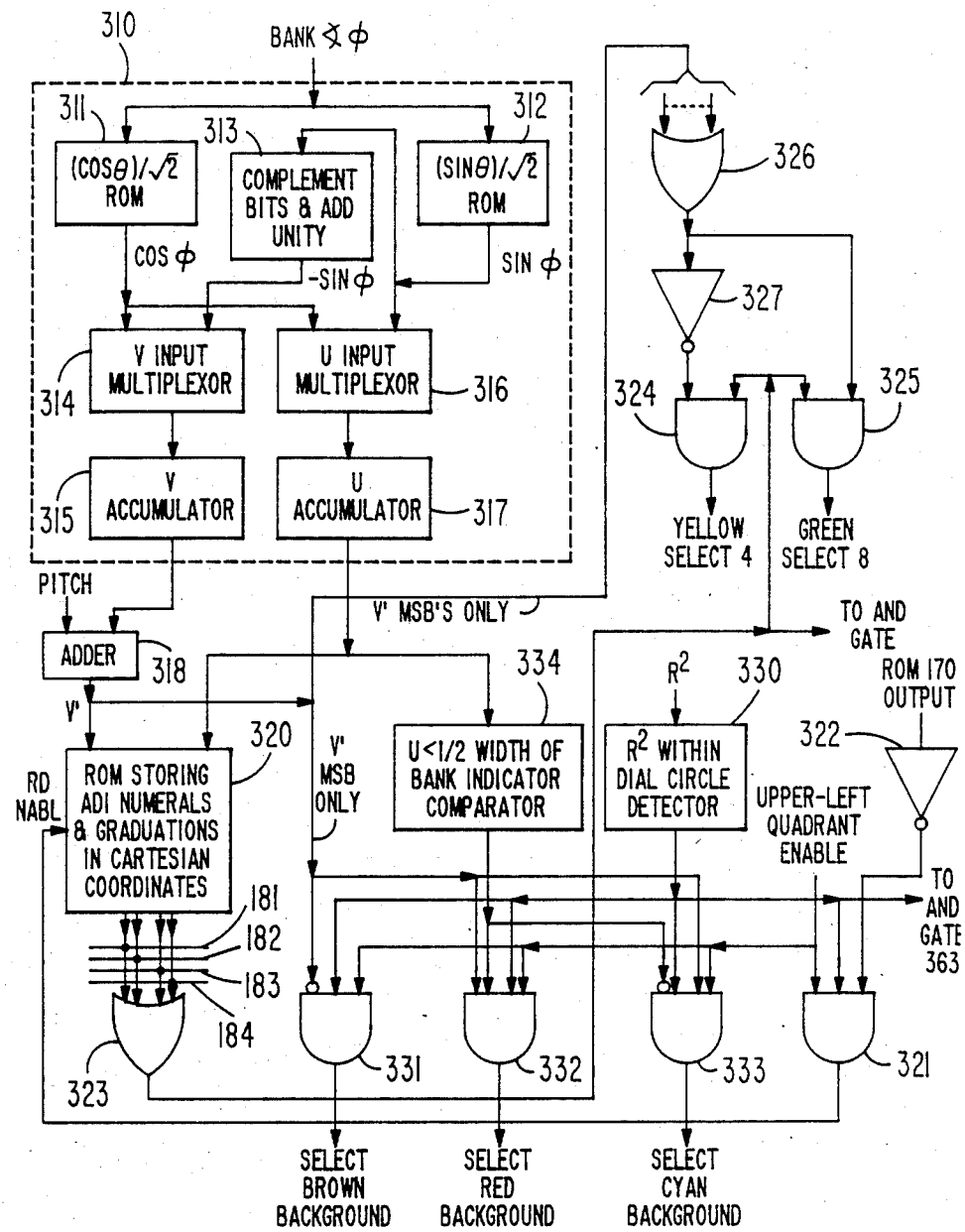

FIG. 17 shows the scan converter 310 for developing a phantom raster scan in the rotated Cartesian coordinates u, v in which is expressed the information concerning the rotated and translated portions of the ADI, those portions inside the green circle with bank indications radiating from it. The u, y coordinates are developed according to the following equations, where ϕ is the angle of rotation of the u, v coordinate system respective to the x, y coordinate system.

$$u = (1/\sqrt{2})[x \cos \phi + y \sin \phi] \quad (1)$$

$$v = (1/\sqrt{2})[-x \sin \phi + y \cos \phi] \quad (2)$$

This is done using accumulation processes described in detail in U.S. Pat. No. 4,462,024 issued Jan. 24, 1984 to C. H. Strolle, entitled MEMORY SCANNING ADDRESS GENERATOR, and assigned to RCA Corporation. The angle of aircraft roll is used as input addressing for ROM's 311 and 312 storing (cos ϕ)/$\sqrt{2}$ and (sin ϕ)/$\sqrt{2}$ in two's complement form. As outlined in Application Ser. No. 305,173, a number of techniques can be used to reduce the actual amount of ROM used for storing these trigonometric functions. Circuitry 313 typically comprising a battery of XOR gates and an adder generate −(sin ϕ)/$\sqrt{2}$ in two's complement form from (sin ϕ)/$\sqrt{2}$. A multiplexor 314 selects (cos ϕ)/$\sqrt{2}$ as input for an accumulator 315 of r-coordinate values during pixel-by-pixel scan of each line of display and selects −(sin ϕ)/$\sqrt{2}$ as input for this accumulator each time there is an advance of scan line in the display field. A multiplexor 316 selects (sin ϕ)/$\sqrt{2}$ as input for an accumulator 317 of u-coordinate values during pixel-by-pixel scan of each line of display and selects (cos ϕ)/$\sqrt{2}$ as input for this accumulator each advance in scan line. The accumulators 315 and 317 are reset and loaded with $2^{8.5}(\sin \phi - \cos \phi)$ and $-2^{8.5}(\cos \phi + \sin \phi)$ at the start of each field scan.

Referring back to equations 1 and 2 in the previous paragraph, the $\sqrt{2}$ scaling factor between the x, y and u, v coordinate systems is introduced so that the information stored in ROM 320 concerning spatial directions other than those parallel to its columns and those parallel to its rows can be sampled at a sufficiently high spatial frequency to avoid aliasing phenomena, even when there is appreciable high-spatial-frequency content in those other directions. This allows the numerals stored in ROM 320 to include diagonal strokes, which increases their visual appeal and legibility, while avoiding the aliasing during their recovery responsive to rotated phantom raster scan that would adversely affect their legibility. The images stored in ROM 320 must be compressed by a factor of $\sqrt{2}$ to compensate for the expansion in display image space of those images as they are recovered from ROM 320.

The v-coordinate output of accumulator 315 corresponds to y-coordinate for level flight, and the aircraft pitch is added to this output in an adder 318 to develop v'-coordinate. The u and v' coordinates describe the translated as well as rotated image space within the green circle in the ADI. Their fractional portions frac u and frac v' are forwarded to fractional coordinate multiplexor 191 in FIG. 19, and their integral portions int u and int v' are used as input addressing for a ROM 320 which stores the artificial horizon line, the graduation lines which parallel it and the numerals associated with selected ones of those lines. ROM 320 is selectively supplied READ ENABLE signal as a ONE from the output of an AND gate 321 responsive to AND gate 321 receiving a ONE as UPPER-LEFT QUADRANT ENABLE signal, a ONE from a detector 330 responsive to r² being less than the square of the radius of the green circle encompassing the rotatable and translatable portion of ADI display, and a ONE from the output of a logic inverter 322 indicative that ROM 170 output is ZERO so the aircraft overlay in center of the ADI display is not being written. When supplied READ ENABLE signal, ROM 320 supplies four spatially adjacent video samples to respective ones 181, 182, 183, 184 of the set 180 of busses to the input of weighted summation network 190.

These video samples are also supplied as inputs to an OR gate 323 to generate a ONE responsive to any of them being a ONE. This ONE output of gate 323 is applied to inputs of AND gates 324 and 325 to enable either the former to deliver a YELLOW SELECT 4 signal at its output, or the latter to deliver a GREEN SELECT 8 signal at its output. The more significant bits of v' are applied as inputs to OR gate 326. The output of OR gate 326, applied as second input to AND gate 325, is ONE in the regions on each side of artificial horizon line to condition AND gate 325 to furnish the output ONE that is GREEN SELECT 8 signal. The output of OR gate 326, applied as input to logic inverter 327, is ZERO in the region containing artificial horizon line. This conditions inverter 327 output, applied as second input to AND gate 324, to be ONE for causing AND gate 324 output to be the ONE that is YELLOW SELECT 4 signal.

The remaining circuitry in FIG. 17 is concerned with selecting the background mat color against which graphic image information is displayed. As will be revealed in the description of FIG. 20 background mat color is magenta absent selection of some other color, so the magenta background mat surrounding the green dial circle does not need to be specifically provided for in generating the ADI display. The outputs of AND gates 331, 332 and 333 will go to ONE for selecting brown, red and cyan backgrounds, respectively.

Each of these AND gates 331, 332, 333 receives as one of its inputs the UPPER-LEFT QUADRANT ENABLE signal supplied from AND gate 141 in FIG. 13, so the outputs of these AND gates can be ONE only in the ADI quadrant of the display. Each of these AND gates 331, 332, 333 receives as one of its inputs the output of detector 330 which goes to one only within the green dial circle. AND gate 331 receives as its third and last input the complemented most significant bit of v', which complemented bit goes to ONE only in the "bottom" half of display. So brown background mat is selected only "below" the artificial horizon line, by AND gate 331 output being ONE. AND gates 332 and 333 receive the non-complemented most significant bit of v' as inputs, so neither of their outputs can go to ONE except "above" the artificial horizon line. A comparator 334 determines whether u-coordinate is or is not less than half the width of the red bank indicator normal to artificial horizon line to supply ONE or ZERO respectively. (This comparator can simply be a NOR gate responsive to the more significant bits of u coordinate.) Comparator 334 output is applied directly as last input to AND gate 332 and is complemented before application as last input to AND gate 333. Comparator 334 output being ONE causes AND gate 332 output to be ONE to select red background, and alternatively comparator 334 output being ZERO causes AND gate 333 output to be ONE to select cyan background.

Figure 18:
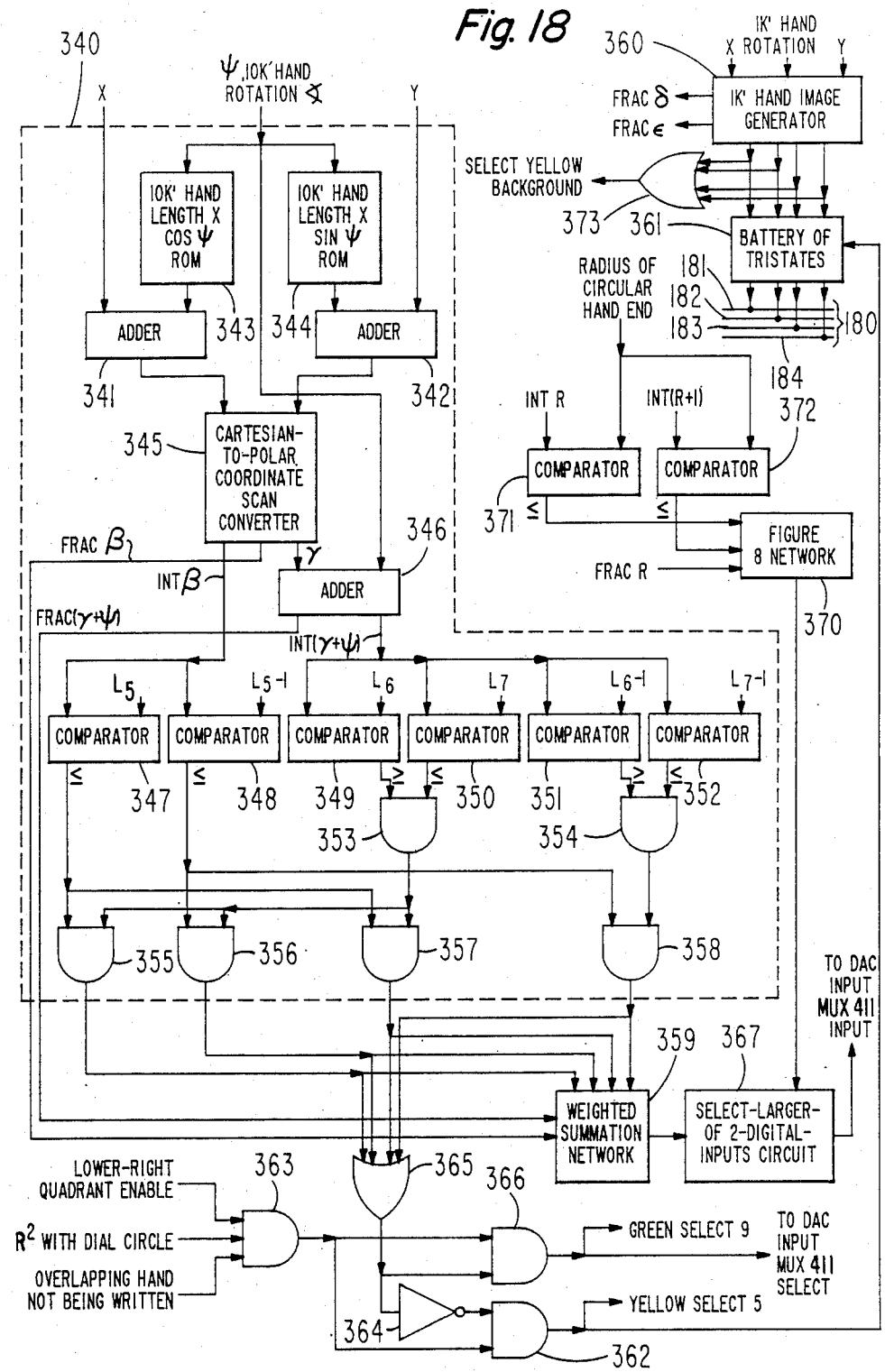

FIG. 18 shows the circuitry for generating the one-thousand-foot and ten-thousand-foot hands for the altimeter in the lower-right quadrant of display. The pointer portions of each of these hands conforms to a respective polar coordinate system having its center at the tip of the hand, which system rotates in a sense opposite to that in which the tip of the hand rotates around the center of the altimeter display. This creates the impression of the hand rotating around the end opposite its tip end.

The image generator for the ten-thousand-foot hand (lying within dashed outline 340) generates the four one-bit video samples and two fractional coordinates descriptive of the pointer portion of the ten-thousand foot hand. The locus of the tip of this pointer portion as a function of $\psi$, its angular position on the display screen, is calculated by adding appropriate offsets to the x and y coordinates descriptive of raster scan, using adders 341 and 342, respectively. The offset added to the x coordinate adder 341 is the length of the ten-thousand-foot hand times cos $\psi$, as supplied from ROM 343 responsive to $\psi$ input; and the offset added to the y coordinate in adder 342 is the length of the hand times sin $\psi$ as supplied from ROM 344 responsive to $\psi$ input. The variably-translated Cartesian coordinates of hand tip are then converted to variably translated polar coordinates in a scan converter 345, $\beta$ being the radial coordinate and $\alpha$ the angular coordinate. The angular coordinate $\alpha$ has $\psi$ added to it in an adder 346 to describe the hand in coordinates $\beta, (\alpha + \psi)$ which rotate around the center of the altimeter display.

The pointer portion of the ten-thousand-foot hand is generated by a region detector of the same general sort as that of FIG. 11. The region detector here is somewhat simpler inasmuch as the limit condition at the tip of the hand, $\beta = 0$, need not be detected since the translated polar coordinate system always radiates from this point. Also, rather than comparing int $\beta$ and int $\rho$ as augmented by unity to a limit $L_5$ defining the length of the pointer portion of the hand, int $\beta$ is compared to $L_5$ and to $L_5$ minus unity in comparators 347 and 348, respectively. This provides the same comparator results without need for an adder, a ONE being supplied by comparator 347 so long as $\beta$ does not exceed $L_5$ and a ONE being supplied by comparator 348 so long as $(\beta + 1)$ and would not exceed $L_5$. Similarly, rather than comparing int $(\alpha + \psi)$ and int $(\alpha + \psi) + 1$ to clockwise and anticlockwise limits $L_6$ and $L_7$ of the pointer portion of the hand, int $(\alpha + \psi)$ is compared to $L_6$ and to $L_7$ in comparators 349 and 350 respectively and to $L_7$ and to $L_7 - 1$ in comparators 351 and 352, respectively. An AND gate 353 responds to the outputs of comparators 349 and 350 to supply a ONE output so long as int $(\alpha + \psi)$ lies within the sector bounded by $L_6$ and $L_7$. And an AND gate 354 responds to the outputs of comparators 351 and 352 to supply a ONE output so long as int $(\alpha + \psi + 1)$ would lie within that sector.

An AND gate 355 responds to the outputs of comparator 347 and AND gate 353 to supply the one-bit video sample associated with int $\beta$, int $(\alpha + \psi)$ coordinates—i.e. a ONE, if and only if these coordinates fall within the pointer portion of the hand, and a ZERO otherwise. A set of AND gates 356, 357, and 358 are connected to respond to the outputs of comparators 347 and 348 and of AND gates 353 and 354 to supply the one-bit video samples associated respectively with int $(\beta + 1)$, int $(\alpha + \psi)$ coordinates, with int $\beta$, int $(\alpha + \psi + 1)$ coordinates and with int $(\beta + 1)$, int $(\alpha + \psi + 1)$ coordinates. These four one-bit video samples are supplied to a weighted summation network 359 to be summed with a weighting governed by frac $\beta$ and frac $(\alpha + \psi)$.

The image generator 360 for the one-thousand-foot hand is similar to image generator 340; but, responsive to ONE output of an AND gate 362, its outputs are multiplexed by a battery 370 of tri-states onto respective ones of the busses 181, 182, 183, and 184 for weighted summation in network 190. Image generator 360 forwards, as inputs to multiplexor 191, frac $\delta$ and frac $\epsilon$ terms to govern the weighting of the summation of these video samples in network 190.

The outputs of the battery 370 of tri-states are conditioned to apply the video samples to respective ones of the busses 181, 182, 183 and 184 from low source impedances responsive to the output of an AND gate 362 being a ONE, which ONE is also used as a YELLOW SELECT 5 signal.

For either of the one-thousand-foot and ten-thousand-foot hands to be written in the display an AND gate 363 must supply an output ONE, which is done responsive to simultaneous receipt of an input ONE supplied as LOWER-RIGHT QUADRANT ENABLE signal from AND gate 144, an input ONE supplied from detector 330 of FIG. 17 when $r^2$ has a value indicative of r being within dial circle, and an input ONE from logic inverter 304 of FIG. 16 indicative that the hundred-foot hand is not being written over the other hands. AND gate 362 has AND gate 363 output applied to it as one of its two inputs, the other being supplied from the output of a logic inverter 364. An OR gate 365 supplies an output ONE if any of the four video samples supplied to weighted summation network 359 is a ONE, so output ONE from OR gate 365 provides indication that ten-thousand-foot hand is being written. The ZERO response of logic inverter 364 to the OR gate 365 output applied to its input being ONE is applied to AND gate 362, to cause an output ZERO therefrom which inhibits writing of the thousand-foot hand on the display screen. If OR gate 365 supplies a ZERO output inverted for application to AND gate 262, indicative that the ten-thousand-foot hand is not being written, and if AND gate 363 output is ONE, AND gate 262 furnishes the output ONE that commands battery 361 of tri-states to impress the outputs of image generator 360 on busses 181, 182, 183 and 184.

An AND gate 366 responds to the outputs of AND gate 363 and of OR gate 365 both being ONE to furnish an output ONE. This ONE provides a GREEN SELECT 9 signal for writing the ten-thousand-foot hand in green. This ONE is also forwarded to a multiplexor 411 in FIG. 19 for commanding the selection of digital video output from a circuit 367, which describes the brightness level at all points in the ten-thousand-foot hand, as input for the digital-to-analog converter 412 in FIG. 20, which develops the video signal to control display brightness.

Circuit 367 selects the larger of two digital video signals to be supplied as its input to multiplexor 411. One of these digital video signals is the output of weighted summation network 359, descriptive of the pointer portion of the ten-thousand-foot hand; and the other is the output of a weighted summation network 370, descriptive of the circular end of this hand. Comparators 371 and 372 compare int r and int r+1, respectively, to the radius of curvature of this end of the hand for supplying ONES as the $S_{a,b}$ and $S_{(a+1),b}$ samples for network 370; and frac r is used as the frac a input. (Note again the degenerate form a region detector takes when the region surrounds the origin of a polar coordinate system.)

Circuit 367, which selects the larger of two digital video inputs describing overlapping regions of image space, is the digital homolog of a non-additive mixer and keeps video level constant through the region of overlap. The other anomalous display condition to be corrected is the writing of magenta background bordering the green ten-thousand-foot hand where it overlaps the yellow one-thousand-foot hand. To do this an OR gate 373 furnishes an output ONE used as a SELECT YELLOW BACKGROUND signal any time at least one of the four video samples from image generator 360 is a ONE.

Figure 19:
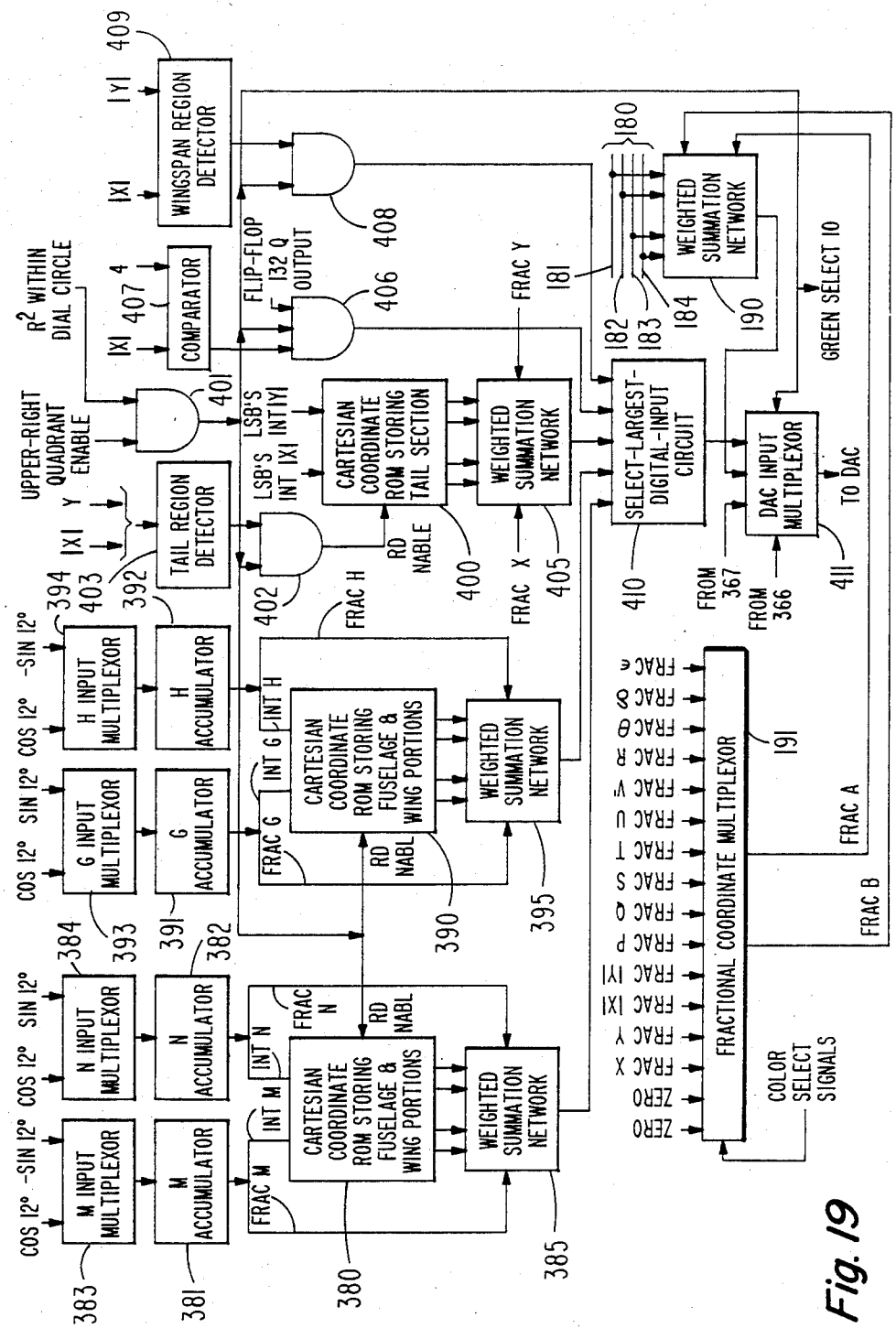

FIG. 19 shows circuitry for generating the top view of the aircraft appearing in the HSI display. The front and back edges of its wing are inclined +12° or -12° with respect to the horizontal axis through HSI center, and the sides of the fuselage are inclined +12° or -12° with respect to the vertical axis through HSI center. A ROM 380 is used to store portions of the graphic image extending back from edges inclined +12° respective to either of the horizontal and vertical axes of the HSI display; and a ROM 390 is used to store portions of the graphic image extending back from edges inclined -12° to either of these axes. The spatial locations of information stored in these ROM's 380 and 390 can overlap with each other and with information concerning the tail section of the aircraft stored in a ROM 400 addressed with the less significant bits int |x| and int y coordinates.

ROM 380 is addressed by the integral portions int m and int n of m and n coordinates provided at the outputs of accumulators 381 and 382. Accumulator 381 accumulates cos 12° or -sin 12° as selected by a multiplexor 383, and accumulator 382 accumulates cos 12° or sin 12° as selected by a multiplexor 384. ROM 390 is addressed by the integral portions int g and int h of g and h coordinates provided at the outputs of accumulators 391 and 392. Accumulator 391 accumulates cos 12° or sin 12° as selected by a multiplexor 393, and accumulator 392 accumulates cos 12° or -sin 12° as selected by a multiplexor 394. These accumulation processes resemble those used to develop u and v coordinates except that, since the angles of axis rotation are fixed, inputs to the multiplexors selecting inputs from the accumulators are fixed, rather than programmable.

An AND gate 401 must receive both a ONE as UPPER-RIGHT QUADRANT ENABLE signal and a ONE from detector 330 of FIG. 17 indicative $r^2$ is within the dial circle, in order to supply an output ONE as READ ENABLE signal to ROM's 380 and 390. The ONE output of AND gate 401 is also used as GREEN SELECT 11 signal.

When read out, ROM 380 supplies four video samples in parallel to a weighted summation network 385. The weighted summation is governed by the fractional portions frac m and frac n of the m and n coordinates supplied by accumulators 381 and 382. When read out, ROM 390 supplies four video samples in parallel to a weighted summation network 395 to be summed with a weighting dependent on frac g and frac h, the fractional portions of the g and h coordinates supplied by accumulators 391 and 392. ROM 400 receives READ ENABLE signal when the output of an AND gate 402 is ONE responsive to ONE input from AND gate 401, together with a ONE output from a detector 403. Detector 403 supplies ONE output when |x| and y are in the ranges descriptive of the region for which ROM 400 stores information. When read out, ROM 400 supplies four video samples in parallel to a weighted summation network 405 for summation with weighting according to frac |x| and frac y.

An AND gate 406 supplies an output ONE that defines the nose pointer of the aircraft in the center of the HSI. This ONE is supplied responsive to the Q output of flip-flop 132 being ONE to indicate y coordinate of raster scan is in top half of instrument display, a ONE output from AND gate 401 indicating raster scan is within the HSI dial circle, and a ONE output from a comparator 407 indicating |x| is less than half the nose pointer width. An AND gate 408 supplies a ONE output responsive to ONE output from AND gate 401 and to ONE output from a detector 409. Detector 409 responds to |x|0 and |y| to provide a ONE output in the region extending from wing tip to wing tip of the aircraft in the center of HSI display.

Selector circuitry 410 selects as its output the largest of its five inputs from weighted summation networks 385, 395, 405, and from AND gates 406 and 408. Circuitry 410 performs a function that is the digital equivalent of the analog function of an non-additive mixer, removing from the video samples at the output of the circuit 410 the overlapping of video samples provided to circuit 410 as inputs. While the aircraft in the center of the HSI is a solid figure, this technique for combining the outputs of several sources used to build up a complex graphic image works reasonably well for line graphics, too, with some likelihood of slight error at intersections of lines drawn from separate memories.

Figure 20:
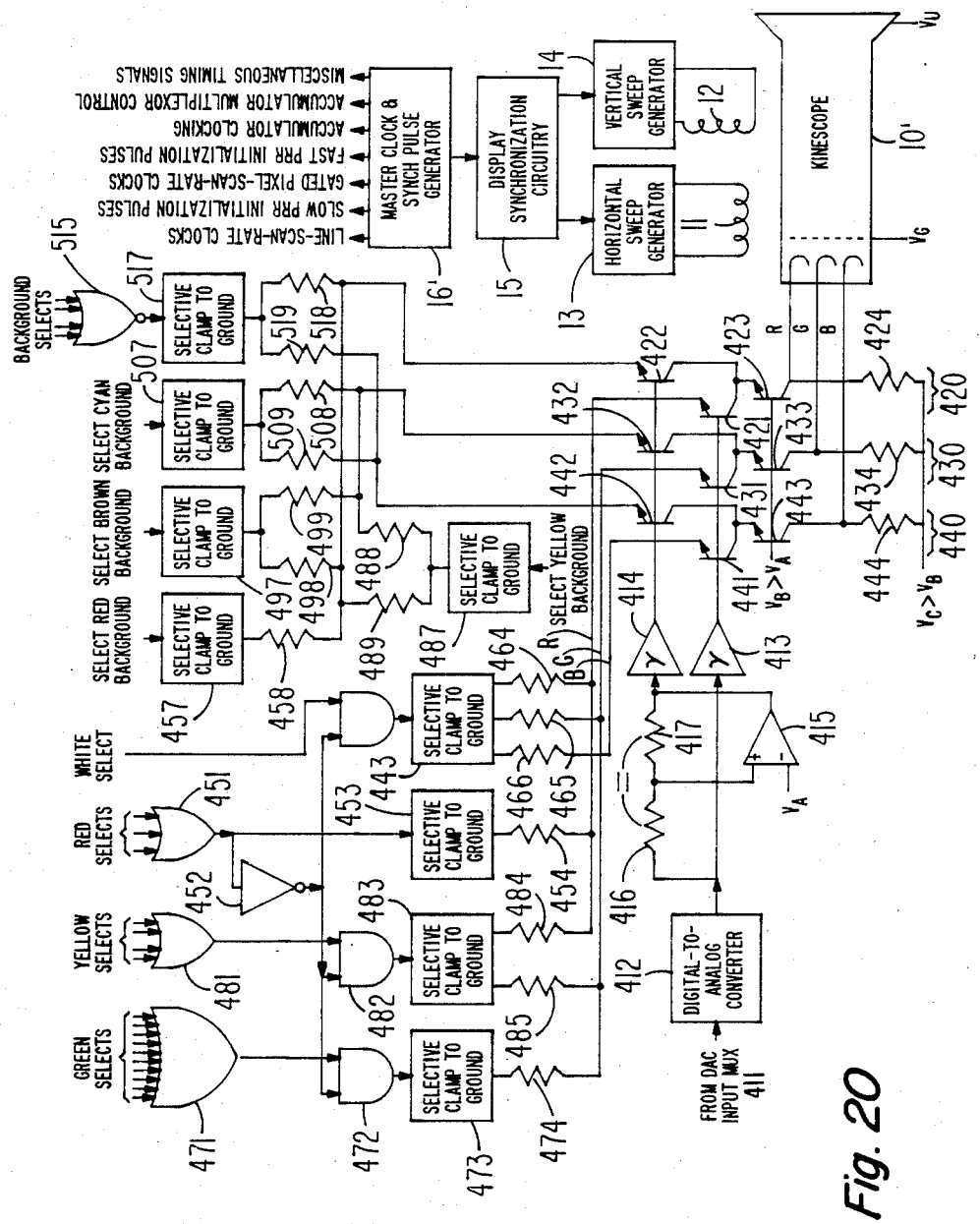

A multiplexor 411 responds to the output of AND gate 401 being a ONE to select the output of selector circuitry 410 as input to a digital-to-analog converter 412, shown in FIG. 20, which converts digital video intensity level information to analog video intensity voltage. Multiplexor 411 responds to the output of AND gate 366 being a ONE to select the output of selector circuitry 367, descriptive of the ten-thousand-foot altimeter hand as input to DAC 393, instead. Multiplexor 411 responds to the outputs of AND gates 366 and 381 output being both ZERO to select the output of weighted summation network 190 as input to DAC 412.

Weighted summation network 190 is supplied four video sample inputs at a time from busses 181, 182, 183, 184 respectively, according to the multiplexing scheme described at points earlier in this specification. The weighting of the samples prior to their summation is governed by frac a and frac b outputs selected by multiplexor 191 from the various fractional coordinates. The color-select signals control this multiplexing, which can be carried forward using batteries of tri-states with outputs to the frac a and frac b parallel-bit busses, for example. As a more specific example, (referring back to FIG. 15) the GREEN SELECT 4 signal from the output of gate 211 can be applied to two batteries of tri-states included in multiplexor 191 to condition them to forward frac r and frac θ from low source impedances to the frac a and frac b busses to weighted summation network 190, to facilitate the weighting of the samples ROM 201 concurrently supplies to network 190 via busses 181, 182, 183, 184.

As multiplexor 191 is shown in FIG. 19, it is assumed that the angular offsets in polar coordinates other than those associated with the thousand-foot altimeter hand are all integral-valued. So frac θ is the applicable fractional coordinate for all of these other polar coordinates, as selected by OR gate response to the associated color-select signals. But, the multiplexor 191 may, of course, be adapted to accommodate non-integral angular offsets by selecting between various angular coordinate fractional portions. Designs in accordance with the invention, but where a greater number of weighted summation networks are used and multiplexing is not so heavily relied on, may be preferred from the standpoint of reduced likelihood of simultaneous loss of more than one critical portion of display.

FIG. 20 shows how the foreground color selection signals, background color selection signals, and the digital video supplied from multiplexor 411 can be utilized to create a color display on the screen of color kinescope 10' in accordance with principles described by C. F. Smollin in his U.S. Pat. No. 4,590,463 issued May 20, 1986, entitled DIGITAL CONTROL OF COLOR IN CRT DISPLAY, and assigned to RCA Corporation. The red, blue and green cathodes of kinescope 10' are driven by video amplifiers 420, 430, and 440, respectively. These video amplifiers are shown in somewhat simplified form in FIG. 20, with their signal coupling and peaking circuits, conventional in nature, omitted for sake of clarifying the essentials of their operation. Each video amplifier comprisies a respective pair of common-emitter amplifier transistors 421, 422, or 431, 432, or 441, 442 supplying their summed collector currents to a common-base amplifier transistor 423 or 433 or 443 with a collector load resistor 424 or 434 or 444. Each one of the common-emitter-amplifier transistors driving one of these common-base-amplifier transistors is in a cascode relationship with that common-base-amplifier transistor. The base electrodes of common-emitter-amplifier transistors 421, 431 and 441 are driven in parallel with gamma-corrected analog video signal from a gamma-correcting amplifier 413. This signal, descriptive of the gray scale of graphic images, is supplied in response to the analog video signal appearing at the output of DAC 412 responsive to digital video supplied its input from the output of multiplexor 391 in FIG. 19. The base electrodes of common-emitter transistors 422, 432 and 442 are driven in parallel by the gamma-corrected video signal descriptive of background mat supplied at the output of a gamma-correcting amplifier 414 responsive to video signal supplied at the output of an operational amplifier 415. The signal supplied to gamma-correcting amplifier 414 is supposed to be equal to the output of DAC 412 subtracted from full video signal output. This can be achieved by connecting operational amplifier 415 with equal-valued resistors 416 and 417, as shown, to obtain a signal voltage gain of minus unity from DAC 412 output to amplifier 415 output, and by arranging direct-voltage biasing appropriately.

Responsive to any of the RED SELECT signals being supplied (RED SELECT 1 or RED SELECT 2 from the output of AND gates 292 and 302 in FIG. 16 or RED SELECT 3 from the logic inverter 304 in FIG. 16) the output of an OR 451 in FIG. 20 is an ONE. The input of OR gate 431 is applied to the input of a logic inverter 432, which responds with a ZERO output so long as OR gate 431 output is ONE. ONE output from OR gate 451 selectively activates a clamp 453 to ground of the end of a resistor 454, the other of which connects to the emitter of transistor 421. (This clamp may be provided at the collector of a grounded-emitter transistor driven by OR gate 451 output applied to its base electrode, for example.) Responsive to the emitter-follower action of transistor 421, a voltage following the gamma-corrected analog video output of amplifier 413 appears across resistor 454, causing in accordance with Ohm's Law a proportionally related emitter current flow from transistor 421. To support this emitter current, collector current is drawn by transistor 421 from the emitter of transistor 433, which draws a similar collector current in turn to support its emitter current supplied as collector current to transistor 421. This similar collector current develops a potential change across collector load resistor 424 in accordance with Ohm's Law, which potential change is applied as drive voltage for the red cathode of kinescope 10'. At the same time there is no selective clamping to ground of ends of any of the other emitter resistors of transistors 421, 431, and 441; so there is no drive voltage applied to the blue and green cathodes of kinescope 10' responsive to gamma-corrected foreground analog video voltage at the bases of these transistors.

WHITE SELECT signal from AND gate 262 in FIG. 16 is applied to an AND gate 462. Absent a ONE output from inverter 452 indicating the overwriting of the white arcuate region in the airspeed indicator by the red indicator hand, AND gate 452 responds with an output ONE. Output ONE from AND gate 462 selectively activates a clamp 463 to ground of the first ends of resistors 464, 465, 466, having their respective second ends connected to the emitters of transistors 421, 431, 441, respectively. This causes drive voltages to be supplied to each of the red, green, and blue cathodes of kinescope 10' responsive to gamma-corrected analog video on the bases of transistors 421, 431, and 441 times the conductances of resistors 464, 465, and 466. These conductances are chosen in such proportion as to cause white response on the display screen.

Responsive to any of GREEN SELECT signals an OR gate 471 supplies an output ONE to an AND gate 472 which, absent a ZERO from inverter 452 indicative of red display information to written in place of green, responds with an output ONE. This ONE selectively activates a clamp 473 to ground of a resistor having its other end at the emitter of transistor 431, to cause drive to the green cathode of kinescope 10' for writing green graphic image on the kinescope screen.

Responsive to any of the YELLOW SELECT signals an OR gate 481 supplies an output ONE to an AND gate 482 which, absent a ZERO from inverter 452, responds with an output ONE. This ONE selectively activates a clamp 483 to ground of the first ends of resistors 484 and 485 having their second ends at the emitters of transistors 421 and 422, respectively. The conductances of these resistances are so chosen that there is yellow trace on the screen of kinescope 10 owing to the drives to its red and green cathodes applied in response to the currents flowing in resistors 484 and 485 owing to gamma-corrected analog video signal being impressed across them.

A clamp 457 responds to SELECT RED BACKGROUND signal, an output ONE supplied from AND gate 332 of FIG. 17, to selectively clamp to ground an end of a resistor 458. The other end of this resistor connects to the emitter of transistor 422 which impresses a gamma-corrected analog video signal across the resistor to cause a proportionally related current flow. Kinescope 10' red cathode is driven responsive to this current flow to make red the background mat against which graphic image is drawn on the kinescope screen.

SELECT BROWN BACKGROUND signal from AND gate 331 in FIG. 17 selectively actuates a clamp 497 to ground of the first ends of resistors 498 and 499, connected at their second ends to the emitters of transistors 422 and 432, respectively. The conductances of resistors 498 and 499 are chosen such that this arranges for brown background mat on kinescope 10' screen. SELECT CYAN BACKGROUND signal from AND gate 333 in FIG. 17 selectively actuates clamp 507 to ground of the first ends of resistors 508 and 509 connected at their second ends to the emitters of transistors 432 and 442, respectively. The conductances of resistors 508 and 509 are chosen such that this arranges for cyan background mat on kinescope 10' screen. SELECT YELLOW BACKGROUND signal from OR gate 373 in FIG. 18 selectively actuates a clamp 487 to ground of the first ends of resistors 488 and 489, the second ends of which respectively connect to the emitter of transistor 422 and to the emitter of transistor 432. The conductances of resistors 488 and 489 are chosen for causing background mat to appear yellow on screen and fill in the one-thousand-foot hand of the altimeter right up to the overlapping green ten-thousand-foot hand.

A NOR gate 515 responds to the absence of SELECT RED BACKGROUND, SELECT BROWN BACKGROUND and SELECT CYAN BACKGROUND signals to supply an output ONE. This output ONE selectively actuates a clamp 517 to ground of the first ends connected to the emitters of transistors 422 and 442, respectively. The conductances of resistors 518 and 519 are chosen such that this results in magenta background mat on kinescope 10' screen.

The foregoing specification has described several different means for generating video samples respectively associated with successive points in the television raster scan, wherein each generated video sample is equal to a weighted summation of video samples supplied for "surrounding" points defining the corners of the area of space in which the point of television raster scan falls. As illustrated in FIG. 1, FIG. 2, and FIG. 5 and in the related portions of this specification the means for generating video samples equal to a weighted summation of samples from these "surrounding" points may actually involve the individualized weighting of the samples from these "surrounding" points and the subsequent summation of these weighted samples. As illustrated in FIG. 6 through FIG. 9, and the related portions of this specification one can generate the video sample equal to the weighted summation of samples from the "surrounding" points by using processes which do not involve individualized weighting of samples from the "surrounding" points and the subsequent summing of the weighted samples. This should be borne in mind when construing the scope of the claims which follow. Even where the specifics of the weighting of the sample from the "surrounding" point are given, this is to be construed as being of concern principally with regard to the ultimate result of obtaining an output sample equal to a weighted summation of input samples, and no limitation that the sample generation process requires individualized weighting of the input samples and subsequent summation of the weighted samples is intended to be implied.

What is claimed is:

1. Apparatus for generating a relatively high-amplitude-resolution video signal descriptive of an edge transition in a graphic image to appear on a display screen, which screen is to be raster scanned during the writing of the display in accordance with a system of orthogonal, Cartesian spatial coordinates in which integral values of one coordinate describe line locations and in which integral values of another coordinate describe pixel locations along a line, and which edge transition portion of the graphic image is defined by at least relatively low amplitude resolution samples of graphic image intensity at points defined by integral portions of another system of orthogonal spatial coordinates, said apparatus comprising:

means for generating in said other system of spatial coordinates a stream of pairs of first and second coordinates describing a phantom raster scan for at least a portion of the display screen raster and having respective integral and fractional values indicative of position in the phantom raster scan;

means for specifying without replication said low-amplitude-resolution samples of graphic image intensity at points in said other system of spatial coordinates specified by integral portions of said first and second coordinates;

means responsive to the integral values of each pair of first and second coordinates for selecting the ones of said low-amplitude-resolution samples of graphic image intensity at four points in said other system of spatial coordinates defining the corners of a spatial region, the location of the first point in said other system of spatial coordinates being specified by the integral values of said first and second coordinates, the location of the second point being specified by the integral value of said first coordinate as modified by unity and by the integral value of said second coordinate, the location of the third point being specified by the integral value of said first coordinate and by the integral value of said second coordinate as modified by unity, and the location of the fourth point being specified by the integral values of said first and second coordinates each as modified by unity; and means for generating, responsive to each set of four low-amplitude-resolution samples of graphic image intensity thus successively selected, a respective sample of said high-amplitude-resolution signal essentially equal to a weighted summation of the then selected set of four low-amplitude-resolution samples, the sample concerning the first point being weighted in proportion to the product of the complements of the fractional portions of said first and second coordinates, the sample concerning the second point being weighted in proportion to the product of the fractional portion of said first coordinate times the complement of the fractional portion of said second coordinate, the sample concerning the third point being weighted in proportion to the product of the complement of the fractional portion of the first coordinate times the fractional portion of said second coordinate, and the sample concerning the fourth point being weighted in proportion to the product of the fractional portions of said first and second coordinates.

2. Apparatus as set forth in claim 1 wherein said means for specifying without replication low-amplitude-resolution samples of said graphic image at points in said other system of coordinates comprises:
a memory multiply-addressable by columns and rows according to the integral portions of the first and second coordinates of said other system of coordinates.

3. Apparatus as set forth in claim 1 wherein said means for specifying without replication low-amplitude-resolution samples of said graphic image in said other system of coordinates includes:
means for controlling the generation of low-amplitude-resolution data concerning first and second points responsive to the value of the integral portion of said first coordinate compared to a predetermined limit value; and
means for controlling the generation of low-amplitude-resolution data concerning third and fourth points responsive to the value of the integral portion of said first coordinate, as modified by unity, compared to said predetermined limit value.

4. Apparatus as set forth in claim 1 wherein said other system of orthogonal spatial coordinates is a non-Cartesian system of spatial coordinates.

5. Apparatus as set forth in claim 4 wherein said non-Cartesian system of spatial coordinates is a polar-coordinate system.

6. Apparatus as set forth in claim 4 wherein the low-amplitude-resolution samples of said graphic image at points in said other system of spatial coordinates are supplied with a spatial sampling density at least as high as that afforded by said stream of pairs of first and second coordinates describing a rotated raster scan.

7. Apparatus as set forth in claim 1 wherein said means for generating a respective sample of said high-amplitude-resolution signal essentially equal to a weighted summation of the then selected set of four low-amplitude-resolution samples comprises:
a first multiplier multiplying the sample concerning said first point by a weight equal to the product of the complements of the fractional portions of said first and second coordinates;
a second multiplier multiplying the sample concerning said second point by a weight equal to the product of the fractional portion of said first coordinate times the complement of the fractional portion of said second coordinate;
a third multiplier multiplying the sample concerning said third point by a weight equal to the product of the complement of the fractional portion of said first coordinate times the fractional portion of said second coordinate;
a fourth multiplier multiplying the sample concerning said fourth point by a weight equal to the product of the fractional portions of said first and second coordinates; and
an adder adding the output results of said first, second, third and fourth multipliers, to generate said respective sample of high-amplitude-resolution signal.

8. Apparatus as set forth in claim 1 wherein said means for generating a respective sample of said high-amplitude-resolution signal essentially equal to a weighted summation of the then selected set of four low-amplitude-resolution samples comprises:
a first subtractor for subtracting the sample concerning said first point from the sample concerning said second point for generating a sample of a first difference signal;
a second subtractor for subtracting the sample concerning said third point from the sample concerning said fourth point for generating a sample of a second difference signal;
first and second multipliers for multiplying the fractional portion of said first coordinate respectively by said sample of a first difference signal and by said sample of a second difference signal;
a first adder adding the product supplied by said first multiplier to said sample concerning the first point for generating a sample of a first sum signal;
a second adder adding the product supplied by said second multiplier to said sample concerning the third point for generating a sample of a second sum signal;
a third subtractor subtracting the sample of the first sum signal from the sample of the second sum signal for generating a sample of a third difference signal;
a third multiplier for multiplying the fractional portion of said second coordinate by the sample of the third difference signal; and
a third adder adding the product supplied by said third multiplier to the sample of the first sum signal, to generate said respective sample of high-amplitude-resolution signal.

9. Apparatus as set forth in claim 1 wherein each said successively selected set of four low-amplitude-resolution samples of graphic image intensity at four points consists of respective one-bit ONE or ZERO indications of image intensity at first, second, third and fourth ones of those points; and wherein said means for generating a respective sample of said high-amplitude-resolution signal essentially equal to a weighted summation of the then selected set of four low-amplitude-resolution samples comprises:

means for selecting zero, one, the fractional portion of the first coordinate, or the complement of that fractional portion as the weighted summation of video levels associated with said first and second four points depending on whether they both are ZERO, they both are ONE, the former is ZERO and the latter is ONE, or the former is ONE and the latter is ZERO;

means for selecting zero, one, the fractional portion of the first coordinate, or the complement of that fractional portion as the weighted summation of video levels associated with said third and fourth points depending on whether they both are ZERO, they both are ONE, the former is ZERO and the latter is ONE, or the former is ONE and the latter is ZERO; and means for generating samples of said high-amplitude-resolution video signal equal to the weighted summation of video levels associated with said first and second points plus the product of the fractional portion of said second coordinate times the difference of the weighted summation of video levels associated with said third and fourth points less the weighted summation of video levels associated with said first and second points.

10. Apparatus for generating a relatively high-amplitude-resolution video signal descriptive of an edge transition in a graphic image to appear on a display screen, which screen is to be raster scanned during the writing of the display in accordance with a system of orthogonal, Cartesian spatial coordinates in which integral values of one coordinate describe line locations and in which integral values of another coordinate describe pixel locations along a line, and the intensity of which graphic image at its edge transition is defined with relatively low amplitude resolution in another system of orthogonal spatial coordinates, said apparatus comprising:

means for generating in said other system of spatial coordinates a stream of pairs of first and second coordinates describing phantom raster scan for at least a portion of the display screen raster and having respective integral and fractional values indicative of position in the phantom raster scan; and means responsive to the integral values of each pair of first and second coordinates for supplying successive respective sets of data concerning image intensity at four points in said other system of spatial coordinates defining the corners of a spatial region, the location of the first point in said other system of spatial coordinates being specified by the integral values of said first and second coordinates, the location of the second point being specified by the integral value of said first coordinate as modified by unity and by the integral value of said second coordinate, the location of the third point being specified by the integral value of said first coordinate and the integral value of said second coordinate as modified by unity, and the location of the fourth point being specified by the integral values of said first and second coordinates each as modified by unity, which means for supplying successive respective sets of data includes:

means comparing at least the less significant bits of the integral portion of the first coordinate of said first point to a prescribed number for defining a different video level descriptive of image intensity at said first point when equality is found than when it is not, means comparing corresponding bits of the integral portion of the first coordinate of said second point to said prescribed number for defining a different video level descriptive of image intensity at said second point when equality is found than when it is not, means comparing corresponding bits of the integral portion of the first coordinate of said third point to said prescribed number for defining a different video level descriptive of image intensity of said third point when equality is found than when it is not, and means comparing corresponding bits of the integral portion of the first coordinate of said fourth point to said prescribed number for defining a different video level descriptive of image intensity at said fourth point when equality is found than when it is not, and means responsive to each set of four video levels descriptive of image intensity at four points for providing a sample of said high-amplitude-resolution video signal essentially equal to a weighted summation of those four video levels.

11. Apparatus as set forth in claim 10 wherein said means for supplying respective successive sets of data concerning graphic image intensity comprises:

means for detecting when the second coordinate of said first point falls within a predetermined range of second coordinates for defining a different video level descriptive of said first point than when it does not so fall;

means for detecting when the second coordinate of said second point falls within said predetermined range of second coordinates for defining a different video level descriptive of said second point than when it does not so fall;

means for detecting when the second coordinate of said third point falls within said predetermined range of second coordinates for defining a different video level of said third point than when it does not so fall; and means for detecting when the second coordinate of said fourth point falls within said predetermined range of second coordinates for defining a different video level descriptive of said fourth point than when it does not so fall.

12. Apparatus as set forth in claim 10 wherein said other system of orthogonal spatial coordinates is a non-Cartesian system of spatial coordinates.

13. Apparatus as set forth in claim 12 wherein said non-Cartesian system of spatial coordinates is a polar-coordinate system.

14. Apparatus as set forth in claim 12 wherein the low-amplitude-resolution samples of said graphic image at points in said other system of spatial coordinates are supplied with a spatial sampling density at least as high as that afforded by said stream of pairs of first and second coordinates describing a rotated raster scan.

15. Apparatus for generating a relatively high-amplitude-resolution video signal descriptive of an edge transition in a graphic image to appear on a display screen, which screen is to be raster scanned during the writing of the display in accordance with a system of orthogonal, Cartesian spatial coordinates in which integral values of one coordinate describe line locations and in which integral values of another coordinate describe pixel locations along a line, and the intensity of which edge transition is defined with relatively low amplitude resolution in another system of orthogonal spatial coordinates, said apparatus comprising:

means for generating in said other system of spatial coordinates a stream of pairs of first and second coordinates describing phantom raster scan for a least a portion of the display screen raster and having respective integral and fractional values indicative of position in the phantom raster scan; and means responsive to the integral values of each pair of first and second coordinates for supplying respective successive sets of data concerning graphic image intensity at four points in said other system of spatial coordinates defining the corners of a spatial region, the location of the first point in said other system of spatial coordinates being specified by the integral values of said first and second coordinates, the location of the second point being specified by the integral value of said first coordinate as modified by unity and by the integral value of said second coordinate, the location of the third point being specified by the integral value of said first coordinate and by the integral value of said second coordinate as modified by unity, and the location of the fourth point being specified by the integral values of said first and second coordinates each as modified by unity, which means for supplying data includes:

means detecting when the first coordinate of said first point falls within a predetermined range of first coordinates for defining a different video level descriptive of said first point than when it does not so fall, means detecting when the first coordinate of said second point falls within said predetermined range of first coordinates for defining a different video level descriptive of said first point than when it does not so fall, means detecting when the first coordinate of said third point falls within said predetermined range of first coordinates for defining a different video level descriptive of said third point when it does not so fall, and means detecting when the first coordinate of said fourth point falls within said predetermined range of first coordinates for defining a different video level descriptive of said fourth point than when it does not so fall, and means responsive to each set of four video levels descriptive of image intensity at four points for providing a respective sample of said high-amplitude-resolution video signal essentially equal to a weighted summation of those four video levels.

16. Apparatus as set forth in claim 15 wherein said means for supplying respective successive sets of data concerning graphic image intensity comprises:

means for detecting when the second coordinate of said first point falls within a predetermined range of second coordinates for defining a different video level descriptive of said first point than when it does not so fall, means for detecting when the second coordinate of said second point falls within said predetermined range of second coordinate for defining a different video level descriptive of said second point than when it does not so fall, means detecting when the second coordinate of said third point falls within said predetermined range of second coordinates for defining a different video level of said third point than when it does not so fall, and means for detecting when the second coordinate of said fourth point falls within said predetermined range of second coordinates for defining a different video level descriptive of said fourth point than when it does not so fall.

17. Apparatus as set forth in claim 15 wherein said other system of orthogonal spatial coordinates is a non-Cartesian system of spatial coordinates.

18. Apparatus as set forth in claim 17 wherein said non-Cartesian system of spatial coordinates is a polar-coordinate system.

19. Apparatus as set forth in claim 17 wherein the low-amplitude-resolution samples of said graphic image at points in said other system of spatial coordinates are supplied with a spatial sampling density at least as high as that afforded by said stream of pairs of first and second coordinates describing a rotated raster scan.

20. Apparatus as set forth in claim 15 wherein said means for providing a respective sample of said high-amplitude-resolution signal essentially equal to a weighted summation of the then selected set of four low-amplitude-resolution samples comprises:

a first multiplier multiplying the sample concerning said first point by a weight equal to the product of the complements of the fractional portions of said first and second coordinates;

a second multiplier multiplying the sample concerning said second point by a weight equal to the product of the fractional portion of said first coordinate times the complement of the fractional portion of said second coordinate;

a third multiplier multiplying the sample concerning said third point by a weight equal to the product of the complement of the fractional portion of said first coordinate times the fractional portion of said second coordinate;

a fourth multiplier multiplying the sample concerning said fourth point by weight equal to the product of the fractional portions of said first and second coordinates; and an adder adding the output results of said first, second, third and fourth multipliers, to generate said respective sample of high-amplitude-resolution signal.

21. Apparatus as set forth in claim 15 wherein said means for providing a respective sample of said high-amplitude-resolution signal essentially equal to a weighted summation of the then selected set of four low-amplitude-resolution samples comprises:

a first subtractor for subtracting the sample concerning said first point from the sample concerning said second point for generating a sample of a first difference signal;

a second subtractor for subtracting the sample concerning said third point from the sample concerning said fourth point for generating a sample of a second difference signal;

first and second multipliers for multiplying the fractional portion of said first coordinate respectively by said sample of a first difference signal and by said sample of a second difference signal;

a first adder adding the product supplied by said first multiplier to said sample concerning the first point for generating a sample of a first sum signal;

a second adder adding the product supplied by said second multiplier to said sample concerning the third point for generating a sample of a second sum signal;

a third subtractor subtracting the sample of the first sum signal from the sample of the second sum signal for generating a sample of a third difference signal;

a third multiplier for multiplying the fractional portion of said second coordinate by the sample of the third difference signal; and a third adder adding the product supplied by said third multiplier to the sample of the first sum signal, to generate said respective sample of high-amplitude-resolution signal.

22. Apparatus as set forth in claim 15 wherein each said successively supplied set of data concerning image intensity at four points consists of respective one-bit ONE or ZERO indications of image intensity at first, second, third and fourth ones of this points; and wherein said means responsive to each set of four video levels descriptive of image intensity at four points for providing a respective sample of said high-amplitude-resolution video signal comprises:

means for selecting zero, one, the fractional portion of the first coordinate, or the complement of that fractional portion as the weighted summation of video levels associated with said first and second points depending on whether they both are ZERO, they both are ONE, the former is ZERO and the latter is ONE, or the former is ONE and the latter is ZERO;

means for selecting zero, one, the fractional portion of the first coordinate, or the complement of that fractional portion as the weighted summation of video levels associated with said third and fourth points depending on whether they both are ZERO, they both are ONE, the former is ZERO and the latter is ONE, or the former is ONE and the latter is ZERO; and means for generating samples of said high-amplitude-resolution video signal equal to the weighted summation of the video levels associated with said first and second points plus the product of the fractional portion of said second coordinate times the difference of the weighted summation of video levels associated with said third and fourth points less the weighted summation of video levels associated with said first and second points.

23. Apparatus for generating a video signal descriptive of a graphic image, comprising:

an image memory having storage locations addressable by column and by row in a non-Cartesian orthogonal coordinate system, for storing in its storage locations a graphic image in low-amplitude-resolution digital form;

means for generating a stream of paired column and row coordinates which describe in said coordinate system points of a raster scanning, which column and row coordinates have respective integral portions and fractional portions descriptive of position in said raster scanning, said integral portions being indicative of possible column and row addresses of storage locations in said image memory, and said fractional portions having no corresponding storage location in said image memory;

means for accessing a selected plurality of spatially adjacent storage locations in said image memory, the selection being responsive to the integral portions of each of said stream of paired column and row coordinates;

means for generating a digital video signal sample essentially equal to a weighted summation of the digital data in each selected plurality of storage locations, the weighting being in a substantially inverse relationship to the distance of those locations from the point specified by the column and row coordinates and being carried out with amplitude resolution greater than that of said graphic image as stored in said image memory; and means responding to the stream of digital video signal samples to synthesize a video signal.

24. Apparatus for generating a video signal descriptive of a graphic image to appear on a display screen, which screen is to be raster scanned during the writing of the display field in accordance with the line locations nominally at successive integral values of first coordinates in a first system of orthogonal spatial coordinates which are Cartesian ones and the pixel locations nominally at successive integral values of second coordinates of said first system, said apparatus comprising:

means for generating in a second system of orthogonal spatial coordinates, a stream of pairs of third and fourth coordinates describing a first phantom raster scan of at least a portion of said display field and having respective integral and fractional values indicative of position in said phantom raster scan, said second system of orthogonal spatial coordinates being Cartesian coordinates rotated respective to those of said first system and scaled such that changes in integral values of the third and fourth coordinates are descriptive of longer distances on the display screen than changes in integral values of the first and second coordinates;

means for defining at integral values of coordinates in said first system video levels of portions of said graphic image having conforming transitions in said first system of coordinates;

means responsive to said first and second coordinates for supplying the video levels associated with the points they specify;

means for defining at integral values of coordinates in said second system video levels of portions of said graphic image having substantially conforming transitions in said second system of coordinates;

means responsive to the integral portions of said third and fourth coordinates for supplying the video levels associated with the four points having integral coordinates in said second system of coordinates most closely defining the spatial region in which falls the point specified by said third and fourth coordinates;

means responsive to fractional portions of said third and fourth coordinates for generating a weighted summation of those video levels associated with points described by the integral portions of said third and fourth coordinates; and means responding to to the video levels associated with the points specified by said first and second coordinates and to said weighted summation for generating a sample of an analog video signal.

25. Apparatus for generating a video signal descriptive of a graphic image to appear on a display screen, which screen is to be raster scanned during the writing of the display field in accordance with the line locations nominally at successive integral values of first coordinates in a first system of orthogonal spatial coordinates which are Cartesian ones and pixel locations normally at successive integral values of second coordinates of said first system, said apparatus comprising:

means for generating in a second system of orthogonal non-Cartesian spatial coordinates a stream of pairs of third and fourth coordinates describing a first phantom raster scan of at least a portion of said display field, and having respective integral and fractional values indicative of position in said first phantom raster scan;

means for defining at integral values of coordinates in said first system video levels of portions of said graphic image having conforming transitions in said first system of coordinates;

means responsive to said first and second coordinates for supplying the video level associated with the points they specify;

means for defining at integral values of coordinates in said second system video levels of portions of said graphic image having conforming transitions in said second system of coordinates;

means responsive to the integral portions of said third and fourth coordinates for supplying the video levels associated with the four points having integral coordinates in said second system of coordinates most closely defining the spatial region in which falls the point specified by said third and fourth coordinates;

means responsive to the fractional portions of said third and fourth coordinates for generating a weighted summation of those video levels associated with points described by the integral portions of said third and fourth coordinates; and means responding to the video level associated with the point specified by said first and second coordinates and to said weighted summation for generating a sample of an analog video signal.

26. Apparatus as set forth in claim 25 wherein said second system of coordinates comprises angular coordinates and coordinates orthogonal to said angular coordinates.

27. Apparatus for generating a video signal descriptive of a graphic image to appear on a display screen, which screen is to be raster scanned during the writing of the display field in accordance with line locations nominally at successive integral values of first coordinates in a first system of orthogonal spatial coordinates which are Cartesian ones and pixel locations nominally at successive interval values of second coordinates of said system, said apparatus comprising:

means for generating in a second system of orthogonal spatial coordinates a stream of pairs of third and fourth coordinates describing a first phantom raster scan of at least a portion of said display field and having a respective integral and fractional values indicative of position in said first phantom raster scan;

means for generating in a third system of orthogonal spatial coordinates a stream of pairs of fifth and sixth coordinates describing a second phantom raster scan of at least a portion of said display field and having respective integral and fractional values indicative of position in ssaid second phantom raster scan;

means for defining at integral values of coordinates in said second system the video levels of portions of said graphic image having conforming transitions in said second system of coordinates;

means responsive to the integral portions of said third and fourth coordinates for supplying the video levels associated with the four points having integral coordinates in said second system of coordinates most closely defining the spatial region in which falls the point specified by those third and fourth coordinates;

means responsive to the fractional portions of said third and fourth coordinates for generating a weighted summation of those video levels associated with points described by the integral portions of said coordinates;

means for defining at integral values of coordinates in said third system the video levels of portions of said graphic image having conforming transitions in said third system of coordinates;

means responsive to the integral portions of said fifth and sixth coordinates for supplying the video levels associated with the four points having integral coordinates in said third system of coordinates most closely defining the spatial region in which falls the point specified by said fifth and sixth coordinates;

means responsive to the fractional portions of said fifth and sixth coordinates for generating a weighted summation of those video levels associated with points described by the integral portions of said coordinates; and means responding to said weighted summations for generating an analog video signal.

28. Apparatus as set forth in claim 27 wherein said second system of coordinates comprises angular coordinates and coordinates orthogonal to said angular coordinates.

29. Apparatus for generating a video signal descriptive of a graphic image to appear on a display screen, which is to be raster scanned during the writing of the display field in accordance with the line locations nominally at successive integral values of first coordinates in a first system of orthogonal spatial coordinates which are Cartesian ones and pixel locations nominally at successive integral values of second coordinates of said first system, said apparatus comprising:

means for generating in a second system of orthogonal spatial coordinates a stream of pairs of third and fourth coordinates describing a first phantom raster scan of at least a portion of said display field and having respective integral and fractional values indicative of position in said first phantom raster scan;

means for generating in a third system of orthogonal spatial coordinates a stream of pairs of fifth and sixth coordinates describing a second phantom raster scan of at least a portion of said display field and having respective integral and fractional values indicative of position in said second phantom raster scan;

means for defining at integral values of coordinates in said first system video levels of portions of said graphic image having conforming transitions in said first system of coordinates;

means for defining at integral values of coordinates in said second system video levels of portions of said graphic image having conforming transitions in said second system of coordinates;

means responsive to the integral portions of said third and fourth coordinates for supplying the video levels associated with the four points having integral coordinates in said second system of coordinates most closely defining the spatial region in which falls the point specified by those third and fourth coordinates;

means responsive to the fractional portions of said third and fourth coordinates for generating a weighted summation of those video levels associated with points described by the integral portions of said third and fourth coordinates;

means for defining at integral values of coordinates in said third system the video levels of portions of said graphic image having conforming transitions in video level;

means responsive to the integral portions of said fifth and sixth coordinates for supplying the video levels associated with the four points having integral coordinates in said third system of coordinates most closely defining the spatial region in which falls the point specified by said fifth and sixth coordinates;

means responsive to the fractional portions of said fifth and sixth coordinates for generating a weighted summation of those video levels associated with points described by the integral portions of said fifth and sixth coordinates; and means responding to the video levels associated with the points specified by said first and second coordinates and to said weighted summations for generating an analog video signal.

30. Apparatus as set forth in claim 29 wherein said second system of coordinates comprises angular coordinates and coordinates orthogonal to said angular coordinates.

31. Apparatus for generating a high-amplitude-resolution video signal descriptive of a plurality of graphic images to be presented with independently programmable degrees of rotation about different centers of rotation on a display screen raster-scanned in accordance with a system of Cartesian coordinates, in which integral values of one coordinate describe line locations and in which integral values of another coordinate describe pixel locations along a line, said apparatus comprising:

means for generating said Cartesian coordinates descriptive of raster scan, so respective first portions thereof are in two's complement form over each region of display screen space wherein is located one of the graphic images to be programmably rotated and are both zero at the center of rotation of that graphic image, and so respective second portions thereof together provide a code descriptive of any time of which region of display screen space said raster scan is traversing at that time;

respective means for defining the video levels of each of said graphic images to be programmably rotated for converting as a function of its degree of rotation the first portions of said Cartesian coordinates to coordinates in its respective further system of coordinates, which coordinates have respective integral portions descriptive of points for which sampled data exist and have fractional portions descriptive of the distances between those points and points in said raster scan defined by integral-valued pairs of said first and second coordinates;

means responsive to the integral portions of pairs of coordinates in each further system, as provided by the respective scan conversion means for obtaining the defined video levels in that further system associated with that set of pairs of coordinates in that further system most closely defining the area of its image space wherein falls the point defined by that pair of coordinates to the integral portions of which response is made;

means responsive to the fractional portions of each pair of coordinates for providing a respective weighted summation; and means responsive to said code for selecting one of said weighted summations as a sample of said video signal.

32. Apparatus as set forth in claim 31 wherein one of said graphic images to be programmably rotated is defined in Cartesian coordinates and another is defined in polar coordinates.

33. Apparatus for generating a high-amplitude-resolution video signal descriptive of a programmably translated and rotated graphic image for presentation on a raster scanned display screen, said apparatus comprising:

means for generating a stream of paired first and second coordinates descriptive of raster scan, which are in a first system of Cartesian coordinates, successive integral values of two of which coordinates respectively describe line locations in the display field and pixel locations along a line;

means for providing a first programmable offset, descriptive in said first system of Cartesian coordinates of the translation of the center of rotation of said graphic image from a reference point on said display screen;

means for linearly combining each component of that first programmable offset in the directions of said first and second coordinates with said first and second coordinates to describe a translated phantom raster scan;

Cartesian-to-polar-coordinate scan converter means for converting the resulting coordinates of such linearly combining to a stream of paired third and fourth coordinates, said third and fourth coordinates being angular and radial coordinates respectively of a second system of coordinates, polar in form;

means for providing a second programmable offset, descriptive in said second system of coordinates of the degree of rotation of said graphic image;

means for linearly combining said second programmable offset with said third coordinate to generate a corresponding fifth coordinate, said fourth and fifth coordinates thus being radial and angular coordinates descriptive in said second system of coordinates of a rotated phantom raster; · means for defining at integral values of coordinates in said second system of coordinates video levels of said graphic image having conforming transitions in said second system of coordinates;

means responsive to the integral portions of said fourth and fifth coordinates for supplying the video levels associated with the four points having integral coordinates in said second system of coordinates most closely defining the spatial region in which falls the point specified by said fourth and fifth coordinates; and means responsive to the fractional portions of said fourth and fifth coordinates for generating a weighted summation of those video levels associated with points described by the integral portions of said coordinates for generating a sample of an analog video signal.

34. Apparatus as set forth in claim 33 wherein said means for providing a first programmable offset is of a type that causes a circular orbit of said graphic image about a fixed point on display screen and said means for providing a second programmable offset is of a type that causes a retrograde planetary rotation of said graphic image about a center of rotation translated along said orbit, such as to cause said graphic image to appear on display screen to rotate about said fixed point.

35. Apparatus for generating video signal from stored digital information descriptive of a complete display image for presentation on a display screen scanned in a first coordinate system comprising:

a plurality of means for storing low-amplitude-resolution digital data concerning respective contiguous portions of said complete display image, addressable in respective coordinate systems in which the stored data are at least substantially conforming, at least one of those coordinate systems differing from said first coordinate system;

means for generating descriptions of display raster scan sample points in each of said coordinate systems;

means for addressing each of said means for storing low-amplitude-resolution digital data with the description of display raster scan in the coordinate system in which the data stored therein are at least substantially conforming, including means for addressing spatial adjacent locations closest to the display raster scan sample points in those coordinate systems other than said first coordinate system;

means for interpolating among the data provided from each of said means for storing low-amplitude-resolution digital data addressed in said other coordinate system; and means for non-additively combining data from each means for storing low-amplitude-resolution digital data addressable in said first coordinate system, if any, with the interpolation result from each means for storing low-amplitude-resolution digital data addressable in said differing coordinate systems, to obtain said video signal.

36. Apparatus for displaying a graphic image comprising:

a color kinescope and associated display screen;

deflection means for causing raster-scanning of said display screen in a first system of spatial coordinates, which comprises an x coordinate in the direction of pixel-by-pixel scanning of scan lines and a y coordinate in the direction of line-by-line scanning of said display screen;

means for generating in another system of spatial coordinates a stream of pairs of first and second coordinates describing phantom raster scan for at least a portion of the display screen raster and having respective integral and fractional values indicative of position in the phantom raster scan;

means responsive to the integral values of each pair of first and second coordinates for supplying data concerning video levels descriptive of said other system of coordinates of a graphic image at four points in said other system of spatial coordinates defining the corners of a spatial region, the location of the first point in said other system of spatial coordinates being specified by the integral values of said first and second coordinates, the location of the second point being specified by the integral value of said first coordinate as modified by unity and by the integral value of said second coordinate, the location of the third point being specified by the integral value of said first coordinate and by the integral value of said second coordinate as modified by unity, and the location of the fourth point being specified by the integral values of said first and second coordinates each as modified by unity;

means responsive to each description of four points for generating a sample of a first high-amplitude-resolution video signal equal to a weighted summation of the video levels descriptive of said graphic image;

means subtracting said first high-amplitude-resolution signal from a fixed video level for generating a second high-amplitude-resolution video signal;

means gamma-correcting said first and second video signals;

first color driver means responding to gamma-corrected first video signal for driving said color kinescope to trace said display screen with a first color; and second color driver means responding to gamma-corrected second video signal for driving said color kinescope to trace said display screen with a second color.

37. A method of efficiently storing information concerning composite low-amplitude-resolution, high-spatial-resolution raster-scanned television image and the subsequent generation of video signals from such information comprising the steps of:

selecting a plurality of orthogonal coordinate systems in which to consider respective components of the composite image that are at least substantially conforming and accurately sampled by a two-dimensional array of sample points regularly spaced in each coordinate direction at such distances as to provide low spatial resolution;

generating high-spatial-resolution descriptions of portions of display raster scan in which each component of the composite image is to appear, each description to be supplied as addresses in the orthogonal coordinate system in which that portion of the composite image is at least substantially conforming;

storing in a respective memory data concerning the level of intensity of each of the components of the composite image at the regularly spaced sample points in that coordinate system, the storing in each memory being at storage locations with addresses corresponding to the more significant portions of the addresses descriptive in that respective coordinate system of the portion of display raster scan in which that component of the composite image is to appear;

extracting data from each of these memories concerning the component of the composite image stored therein, responsive to the more significant portions of the high-spatial-resolution addresses in the orthogonal coordinate system in which the addresses of its storage locations are specified;

using, in each case where there are only zero-valued less significant portions of the high-spatial-resolution addresses, the data extracted from the storage location in said memory specified by the more significant portions of the high-spatial-resolution addresses directly, as image data;

extracting, in each case where at least one of the less significant portions of the high-spatial-resolution addresses is zero-valued, the data concerning spatially adjacent sample points closest to the point in image space specified by the more significant and less significant portions of the generated address;

interpolating among said data concerning spatially adjacent sample points according to those less significant portions to obtain component image data; and non-additively combining the component image data from said memories to generate composite image data.

38. A method of efficiently storing image-intensity information concerning circular arc portions of a low-amplitude resolution, high-spatial-resolution raster-scanned television image and the subsequent generation of video samples from such information comprising the steps of:

storing in a memory, addressed in angular and radial coordinates of image space, image-intensity information concerning only the circular arc portions and other at least substantially conforming portions of said image;

generating high-spatial-resolution descriptions of portions of the display raster scan in which the stored portions of said television image are to be displayed, each description to be supplied as polar coordinate addresses;

extracting data from said memory responsive to the more significant portions of said addresses;

using, in each case where the less significant portions of said addresses are zero-valued, the data extracted from the storage location in said memory specified by the more significant portion of said addresses directly, as image data:

extracting from said memory in each case where at least one of the less significant portions of said addresses is zero-valued, spatially adjacent data closest to the points in image space specified by the more significant and less significant portions of the generated addresses; and interpolating among those spatially adjacent data according to the less significant bits of the generated address to develop samples of said video signal.

39. A method of efficiently storing image-intensity information concerning intersecting straight line portions of a low-amplitude resolution, high-spatial-resolution raster-scanned television image and the subsequent generation of video signals from such information comprising the steps of:

storing in a memory, addressed in angular and radial coordinates of image space having their origin at the point of intersection of said intersecting straight line portions, image-intensity information concerning only the intersecting straight line portions and other at least substantially conforming portions of said image;

generating high-spatial-resolution descriptions of portions of the display raster scan in which the stored portions of said television image are to be displayed, each description to be supplied as polar coordinate addresses;

extracting data from said memory responsive to the more significant portions of said addresses;

using, in each case where the less significant portions of said addresses are zero-valued, the data extracted from the storage location in said memory specified by the more significant portion of said addresses directly, as image data:

extracting from said memory in each case where at least one of the less significant portions of said addresses is zero-valued, spatially adjacent data closest to the points in image space specified by the more significant and less significant portions of the generated addresses; and interpolating among those spatially adjacent data according to the less significant bits of the generated address to develop samples of said video signal.

40. Apparatus for generating from one-bit video level samples a plural-bit amplitude-resolution video signal descriptive of a graphic image to appear on a display screen raster-scanned during the writing of the display, including:

means for generating a description of phantom raster scan in successive sets of first and second coordinates of an orthogonal coordinate system, each of which sets indicates a position in said phantom raster scan, said first and second coordinates having respective integral portions, at least one of said coordinates having at least at times a respective fractional portion as well;

means for continuously supplying one-bit ONE or ZERO indications of video level at four points in said orthogonal coordinate system defining an area within which fall successive points of said phantom raster scan;

means for selecting zero, one, the fractional portion of the first coordinate, or the complement of that fractional portion as the weighted summation of video levels associated with the first and second of the four points depending on whether they both are ZERO, they both are ONE, the former is ZERO and the latter is ONE, or the former is ONE and the latter is ZERO;

means for selecting zero, one, the fractional portion of the first coordinate, or the complement of that fractional portion as the weighted summation of video levels associated with the third and fourth of the four points depending on whether they both are ZERO, they both are ONE, the former is ZERO and the latter is ONE, or the former is ONE and the latter is ZERO; and means for generating a video sample equal to the weighted summation of video levels associated with said first and second points plus the product of the fractional portion of said second coordinate times the difference of the weighted summation of video levels associated with said third and fourth points less the weighted summation of video levels associated with said first and second points.

41. Apparatus for generating a video signal descriptive of an image to appear on a display screen, which screen is to be raster scanned during the writing of the display in accordance with a system of orthogonal, Cartesian spatial coordinates, in which integral values of one coordinate describe line locations and in which integral values of another coordinate describe pixel locations along a line, said apparatus comprising:

means for generating in another system of spatial coordinates a stream of pairs of first and second coordinates describing phantom raster scan for at least a portion of the display screen raster, and having respective integral and fractional values indicative of position in the phantom raster scan;

means responsive to the integral values of each pair of first and second coordinates for supplying data concerning video levels descriptive of said graphic image at four points in said other system of spatial coordinates defining the corners of a spatial region, the location of the first point in said other system of spatial coordinates being specified by the integral values of said first and second coordinates, the location of the second point being specified by the integral value of said first coordinate as modified by unity and by the integral value of said second coordinate, the location of the third point being specified by the integral value of said first coordinate and by the integral value of said second coordinate as modified by unity, and the location of the fourth point being specified by the integral values of said first and second coordinates each as modified by unity;

means for multiplying together, after each pair of first and second coordinates is generated, the complement of the fractional portion of said first coordinate, the complement of the fractional portion of said second coordinate and the datum at the first point associated with that pair of coordinates to obtain a first product associated therewith;

means for multiplying together, after each pair of first and second coordinates is generated the fractional portion of the first coordinate, the complement of the fractional portion of the second coordinate, and the datum at the second point associated with that pair of coordinates to obtain a second product associated therewith;

means for multiplying together, after each pair of first and second coordinates is generated, the complement of the fractional portion of said first coordinate, the fractional portion of said second coordinate, and the datum at the third point associated with that pair of coordinates to obtain a third product associated therewith;

means for multiplying together, after each pair of first and second coordinates is generated, the fractional portion of said first coordinate, the fractional portion of said second coordinate, and the datum at the fourth point associated with that pair of coordinates to obtain a fourth product associated therewith; and means for summing the first, second, third and fourth products associated with each pair of first and second coordinates to obtain a sample of said video signal.

42. Apparatus for generating a raster-scanned, montage video signal descriptive of a display field having a background and having a foreground object superposed on said background, said apparatus comprising:

means for supplying raster-scanned, background video signals;

a foreground image memory for storing video signal samples descriptive of said foreground object, in addressable storage locations conforming to an array of sample points in a foregoing image space;

means for generating a sample-data phantom raster scan of the addressable storage locations in said foreground image memory over a selected region overlapping said background in said display field;

means for generating video signal dependent on the video signal samples read from said foreground image memory in said selected region; and means, selecting said dependent video signal as said selected region is scanned and otherwise selecting said background video signal, for providing said montage video signal.

43. Apparatus for generating a montage video signal as set forth in claim 42 including means for rotating said phantom raster scan respective to said normal raster scan by an amount of rotation that can be changed responsive to a control signal.

44. Apparatus for generating a montage video signal, as set forth in claim 42 including:

means for generating a sample-data normal raster scan including points in said selected region;

means, including said means for generating a sample-data phantom raster scan of the addressable storage locations in said foreground image memory, for generating sample-data phantom raster scan with resolution greater than that afforded by the addressable storage locations in said foreground image memory;

means, within said foreground image memory, responding to those portions of phantom raster scan descriptive of resolution no greater than that afforded by the addressable locations in said foreground image memory, for supplying in parallel video signal samples stored in addressable locations surrounding the current point in normal raster scan as translated to said foreground image space; and means, within said means for generating video signal dependent on the video signal samples read from said foreground image memory, for interpolating among each group of parallel video signal samples, in accordance with those portions of phantom raster scan descriptive of resolution greater than that afforded by the addressable locations in said foreground image memory, thereby to generate a stream of interpolated video signal samples as said video signal dependent on the video signal samples read from said foreground image memory.

45. Apparatus for generating a raster-scanned, montage video signal descriptive of a display field having a background and having a foreground object superposed on said background, said apparatus comprising:

means for supplying raster-scanned background video signals;

a foreground image memory for storing video signal samples descriptive of said foreground object, in addressable storage locations conforming to an array of sample points in a foreground image space;

means for generating a sample-data phantom raster scan of the addressable storage locations said foreground image memory over a selected region overlapping said background in said display field;

means for detecting whether each video signal sample currently read from said foreground image memory has a value indicative of the presence of said foreground object or has a value indicative of the absence of said foreground object;

means, responsive to detecting a video signal sample has a value indicative of the absence of said foreground object, for selecting said background video signal as said montage video signal; and means, responsive to detecting a video signal sample has a value indicative of the presence of said foreground object, for generating said montage video signal from the video signal samples supplied from said phantom-raster-scanned display memory.

46. Apparatus for generating a montage video signal as set forth in claim 45 including means for rotating said phantom raster scan respective to said normal raster scan by an amount of rotation that can be changed responsive to a control signal.

47. Apparatus for generating a montage video signal, as set forth in claim 45 including:

means for generating a sample-data normal raster scan including points in said selected region;

means, including said means for generating a sample-data phantom raster scan of the addressable storage locations in said foreground image memory, for generating sample-data phantom raster scan with resolution greater than that afforded by the addressable storage locations in said foreground image memory;

means, within said foreground image memory, responding to those portions of phantom raster scan descriptive of resolution no greater than that afforded by the addressable locations in said foreground image memory, for supplying in parallel video signal samples stored in addressable locations surrounding the current point in normal raster scan as translated to said foreground image space; and means, within said means for generating video signal dependent on the video signal samples read from said foreground image memory, for interpolating among each ground of parallel video signal samples, in accordance with those portions of phantom raster scan descriptive of resolution greater than that afforded by the addressable locations in said foreground image memory, thereby to generate a stream of interpolated video signal samples as said video signal dependent on the video signal samples read from said foreground image memory.

48. Apparatus for generating a raster-scanned, montage video signal descriptive of a display field having a background and having a rotatable foreground object superposed on said background, said apparatus comprising:

means for generating a sample-data display field raster scan in first and second orthogonal spatial coordinates, which first and second spatial coordinates are signed Cartesian coordinates each zero-valued at display field center;

means providing a background image data sample for each point in display field space described by a pair of integral-valued first and second spatial coordinates, contemporaneously with said display raster scan passing through the point in display field space;

means for adding respective offset to said first and second spatial coordinates descriptive of display raster scan, to generate third and fourth spatial coordinates descriptive of a displaced display field raster scan, which third and fourth spatial coordinates are translated, signed Cartesian coordinates each zero-valued at a center of rotation for said foreground object in said display field;

means for transforming said third and fourth spatial coordinates to fifth and sixth orthogonal spatial coordinates of a phantom raster scan, which fifth and sixth spatial coordinates are zero-valued at said center of rotation for said foreground object, and describe an image space rotated respective to that mapped by said displaced display field raster scan, with the degree of rotation about said center of rotation being controlled responsive to a control signal;

a foreground image memory for storing foreground image data samples in storage locations addressable by pairs of integral valued fifth and sixth spatial coordinates during reading of said foreground image memory;

means for assigning priority over background image data samples to at least selected ones of said foreground image data samples read from said foreground image memory;

means for generating said montage video signal using said background image data samples except when foreground image data samples read from said foreground image memory are ones having priority assigned to them; and means for generating said montage video signal from said foreground image data samples when they are read from said foreground image memory, providing said foreground image data samples are ones having priority assigned to them.

49. Apparatus as set forth in claim 48 wherein said means for transforming said third and fourth coordinates is of a type generating said fifth and sixth coordinates as rotated and translated, signed Cartesian coordinates.

50. Apparatus as set forth in claim 48 wherein means for transforming said third and fourth coordinates includes:

means for generating said fifth coordinate as the radial coordinate of first and second polar-coordinate systems, the first polar coordinate system mapping without rotation said displaced display field, and the second polar coordinate system being that in which said foreground image memory is addressed;

means for generating the angular coordinate of said first polar coordinate system from said third and fourth coordinates; and means adding to that angular coordinate an offset corresponding to said control signal, for generating the angular coordinate of said polar coordinate system as said sixth coordinate.

* * * * *

UNITED STATES PATENT AND TRADEMARK OFFICE
CERTIFICATE OF CORRECTION

PATENT NO. : 4,656,467
DATED : Apr. 7, 1987
INVENTOR(S): Christopher H. Strolle

It is certified that error appears in the above-identified patent and that said Letters Patent is hereby corrected as shown below:

On the front page, after item [22], insert item [30] as follows:

-- Foreign Application Priority Data
Jan. 26, 1981 [GB] United Kingdom 8102281
Apr. 8, 1981 [GB] United Kingdom 8111027 --

Col. 6, line 24, "cathde" should be --cathode--
Col. 8, line 23, "each-only" should be --read-only--
Col. 15, line 65, "134" should be --124--
Col. 16, line 6, "lower-right" should be --lower-left--
Col. 18, line 46, "pixal" should be --pixel--
Col. 26, line 59, delete boldface "0"

Signed and Sealed this

First Day of December, 1987

Attest:

DONALD J. QUIGG

Attesting Officer

Commissioner of Patents and Trademarks